(12) United States Patent
Audet et al.

(10) Patent No.: US 11,023,121 B2
(45) Date of Patent: *Jun. 1, 2021

(54) METHOD OF TRANSVERSALLY ALIGNING INFORMATION ELEMENTS ALONG AXES

(71) Applicant: 9224-5489 QUEBEC INC., Sherbrooke (CA)

(72) Inventors: Mathieu Audet, Orford (CA); Francois Cassistat, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/882,617

(22) Filed: May 25, 2020

(65) Prior Publication Data

US 2020/0301555 A1 Sep. 24, 2020

Related U.S. Application Data

(63) Continuation of application No. 15/997,478, filed on Jun. 4, 2018, now Pat. No. 10,671,266.

(Continued)

(51) Int. Cl.
*G06F 3/0482* (2013.01)
*G06F 16/51* (2019.01)
(Continued)

(52) U.S. Cl.
CPC .......... *G06F 3/0485* (2013.01); *G06F 3/0482* (2013.01); *G06F 16/2455* (2019.01); *G06F 16/284* (2019.01)

(58) Field of Classification Search
CPC .... G06F 16/00; G06F 16/284; G06F 16/2455; G06F 3/0485; G06F 3/0482
See application file for complete search history.

(56) References Cited

U.S. PATENT DOCUMENTS

| 2003/0122874 | A1* | 7/2003 | Dieberger | G06F 16/904 |
| | | | | 715/764 |
| 2004/0001106 | A1* | 1/2004 | Deutscher | G06F 16/40 |
| | | | | 715/838 |

(Continued)

OTHER PUBLICATIONS

Freeze or Lock Specific Rows and Columns when Scrolling in Excel, Jan. 13, 2016, 3 pages (Year: 2016).*

(Continued)

*Primary Examiner* — Yongjia Pan
(74) *Attorney, Agent, or Firm* — Mathieu Audet

(57) ABSTRACT

A method of retrieving multiple copies of an information element on a display is presented, the method comprising displaying a plurality of information elements along a first axis including a first axial direction thereof, displaying a second plurality of information elements along a second axis including a second axial direction thereof parallel with the second direction, the first axis displaying a first information element thereon, the second axis including the first information element thereon, the first information element on the second axis being not transversally aligned with the first information element displayed on the first axis and displacing at least one of the first axis of information elements and the second axis of information elements to display the first information element from the first axis of information elements adjacent to the first information element from the second axis of information elements.

20 Claims, 26 Drawing Sheets

Related U.S. Application Data

(60) Provisional application No. 62/515,093, filed on Jun. 5, 2017.

(51) Int. Cl.
    *G06F 16/34*     (2019.01)
    *G06F 3/0485*     (2013.01)
    *G06F 16/28*     (2019.01)
    *G06F 16/2455*     (2019.01)
    *G06F 16/00*     (2019.01)

(56) References Cited

U.S. PATENT DOCUMENTS

| | | | | |
|---|---|---|---|---|
| 2008/0082938 | A1* | 4/2008 | Buczek | G06F 40/18 715/784 |
| 2008/0295016 | A1* | 11/2008 | Audet | G06F 16/93 715/772 |
| 2012/0260204 | A1* | 10/2012 | Audet | G06Q 10/10 715/769 |
| 2012/0299926 | A1* | 11/2012 | Hodes | H04N 21/472 345/440 |
| 2013/0080880 | A1* | 3/2013 | Cassistat | G06F 3/0482 715/244 |
| 2013/0124990 | A1* | 5/2013 | Lettau | G11B 27/34 715/716 |
| 2013/0271498 | A1* | 10/2013 | Poalini | H04M 1/72522 345/660 |
| 2014/0181649 | A1* | 6/2014 | Audet | G06F 16/93 715/277 |
| 2015/0032698 | A1* | 1/2015 | Cochrane | G06F 16/128 707/638 |
| 2018/0349006 | A1* | 12/2018 | Lindley | G06F 3/0485 |

OTHER PUBLICATIONS

How to lock the horizontal scrolling of a scrollView in iOS, Mar. 11, 2011, 5 pages (Year: 2011).*

* cited by examiner

METHOD OF TRANSVERSALLY ALIGNING INFORMATION ELEMENTS ALONG AXES

CROSS-REFERENCES

The present invention claims priority from U.S. patent application Ser. No. 15/997,478, filed Jun. 4, 2018, entitled METHOD AND APPARATUS OF ALIGNING INFORMATION ELEMENT AXES, which '478 application claims priority from U.S. Provisional Patent Application No. 62/515,093, filed Jun. 5, 2017, entitled METHOD AND APPARATUS OF ALIGNING INFORMATION ELEMENT AXES. These documents are incorporated herein by reference in their entireties.

BACKGROUND OF THE INVENTION

1. Field of the Invention

This invention relates generally to computer systems adapted to manage information elements disposed on arrays and axes thereof. The present invention more specifically relates to methods and apparatuses for displaying, organizing, navigating and aligning information elements disposed in arrays and axes thereof.

2. Description of the Related Art

Graphical user interfaces (GUI's) are getting more and more graphically rich in displaying documents, icons and other information elements. Lists of documents are increasingly turning into highly graphical sequences of documents that allow users to infer greater meaning than from prior lists thanks to more graphically complex thumbnails, icons and file previews arrangements, the large number of documents presented and the customized ordering of the sequence itself.

Multiple arrays and axes (axes will be used in the text to ease its reading) of documents may be combined into one common collection of axes, chosen by a user or not, and adapted to be shown on a display.

While displaying multiple axes with various quantities of documents thereon, it may be desirable to let the user scroll them through various navigation techniques. The display may be showing only a portion of the axes at the same time. It may happen that some documents may be displayed in multiple axes at once.

It is therefore desirable to provide tools to retrieve a subject document of reference and help the user to find other instances (copies) in the collection of axes.

It is equally desirable to graphically align multiple instances of the same subject document displayed in a plurality of other axes.

It is also desirable to graphically discriminate axes of documents that includes the subject document from other axes that don't include the subject document.

It is desirable to provide tools to retrieve documents related to the subject document and graphically find and axially align these related documents in a plurality of axes.

It is equally desirable to axially align timelines of a plurality of axes.

It is also desirable to graphically discriminate axes which have documents related to the subject document from the axes that do not include related documents.

Other deficiencies and opportunities will become apparent to one skilled in the art to which the invention pertains in view of the following summary and detailed description with its appended figures.

SUMMARY OF THE INVENTION

It is one aspect of the present invention to alleviate one or more of the shortcomings of background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention is generally described as a method, a system, a device and/or a graphical user interface used to represent multiple computer files, documents, information elements or other data, hereinafter referred to documents without limitative intention but to facilitate reading of the text, on axes in an axis-based graphical user interface (GUI).

Aspects of our work provide, in accordance with at least one embodiment thereof, a method and system thereof allowing alignment of a plurality of axes in respect with a subject reference document.

One aspect of the instant invention provides, in accordance with at least one embodiment thereof, a method and system thereof allowing a chronological alignment of a plurality of axes.

One aspect of the instant invention provides, in accordance with at least one embodiment thereof, a means for graphically searching other instances of a subject document that are found in other axes.

Moreover, one other aspect of the instant invention provides, in accordance with at least one embodiment thereof, a method and system thereof allowing the chronological alignment of axes on a basis of a position where a subject document is located on an axis and chronologically aligning other axes when no other instances of the subject document is found.

In one aspect of the instant invention, in accordance with at least an embodiment thereof, is allowing an axes-locking mechanism preventing the alignment or centering of the locked axes.

In one other aspect of the present invention, in accordance with at least an embodiment thereof, provides an indication of the presence of other instance of a subject reference document outside of a display area and an indication of the alignment of the axe to the next or previous instance or reference document.

Another aspect of the present invention, in accordance with at least one embodiment thereof, provides a mechanism to set a link between two documents, giving the possibility to retrieve documents related to a document of reference.

Another aspect of the present invention provides, in accordance with at least one embodiment thereof, a mechanism to align related documents in orthogonal axes with the document of reference.

Another aspect of the present invention provides, in accordance with at least one embodiment thereof, a mechanism to align related documents over multiple user interface display areas, or windows.

Embodiments of the subject invention, in accordance with embodiments thereof, can be embodied as a computer system, a method, an operating system and a graphical user interface adapted to manage data and documents by juxtaposing the data on axes of documents in a manner such that data, documents and axes thereof are parameterizable and usable by a plurality of users and can be displayed according to a selection of information, metadata or attributes as deemed relevant by user or users in a single-user or networked environment.

Another aspect of our work provides, in accordance with at least one embodiment thereof, an object-oriented computing system. The computing system comprises a processor, a memory coupled to the processor, and an interface. The computer system comprises a computer-readable storage medium storing instructions, such as a software program adapted to carry out the embodiments. The instructions that, when executed, provide a processor-based system the steps to modify the type and quantity of information used to build and display a document, axis and/or workspace on a variety of devices including but not limited to computers, mobile phones or tablets.

In another aspect of our work, in accordance with at least one embodiment thereof, a graphical user interface is provided. The graphical user interface displays one or more axes of documents in accordance with the implementation of a method that manages documents and the data associated therewith.

An aspect of our work provides, in accordance with at least one embodiment thereof, a method of aligning axes of information elements, the method comprising displaying a plurality of information elements along a first axis including a first axial direction thereof, the first plurality of information elements having a first commonality thereof, displaying a second plurality of information elements along a second axis including a second axial direction thereof, the second plurality of information elements having a second commonality thereof, the first axis displaying a first document thereon, the second axis including the first information element thereon, the first information element on the second axis being not aligned with the first information element displayed on the first axis and displacing at least one of the first axis of information elements and the second axis of information elements to display the first information element from the first axis of information elements adjacent to the first information element from the second axis of information elements.

An aspect of our work provides, in accordance with at least one embodiment thereof, a method of retrieving multiple copies of an information element on a display, the method comprising displaying a plurality of information elements along a first axis including a first axial direction thereof, displaying a second plurality of information elements along a second axis including a second axial direction thereof parallel with the second direction, the first axis displaying a first information element thereon, the second axis including the first information element thereon, the first information element on the second axis being not transversally aligned with the first information element displayed on the first axis and displacing at least one of the first axis of information elements and the second axis of information elements to display the first information element from the first axis of information elements adjacent to the first information element from the second axis of information elements.

An aspect of our work provides, in accordance with at least one embodiment thereof, a method of performing a relational search, the method comprising providing a first axis including a plurality of information elements located thereon in accordance with a first collation function, each information element being associated with a respective collation position along a longitudinal direction of the first axis, providing a second axis including a plurality of information elements located thereon in accordance with a second collation function, each information element being associated with a respective collation position, each information element being associated with a respective collation position along a longitudinal direction of the first axis, selecting an information element from the first axis, enabling an aligning function, searching the second axis for a presence of an instance of the selected information element, when an instance of the selected information element is found on the second axis, scrolling the second axis to locate the instance of the selected information element nearby the selected information element on the first axis.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

DESCRIPTION OF EMBODIMENT(S) OF THE INVENTION

Our work is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate describing the present invention.

The features provided in this specification mainly but might not exclusively relate to principles of computer software and machine-readable code/instructions adapted to instruct a computer, many computers or other machines adapted to use the instructions to provide material effects on a display, or other means enabling human-computer interactions to manage documents, menus, user-selectable elements and other computer files. These code/instructions are preferably stored on a machine-readable medium to be read and acted upon with a computer or machine having the appropriate code/instructions reading capability.

Exemplary Network

Figure 1:
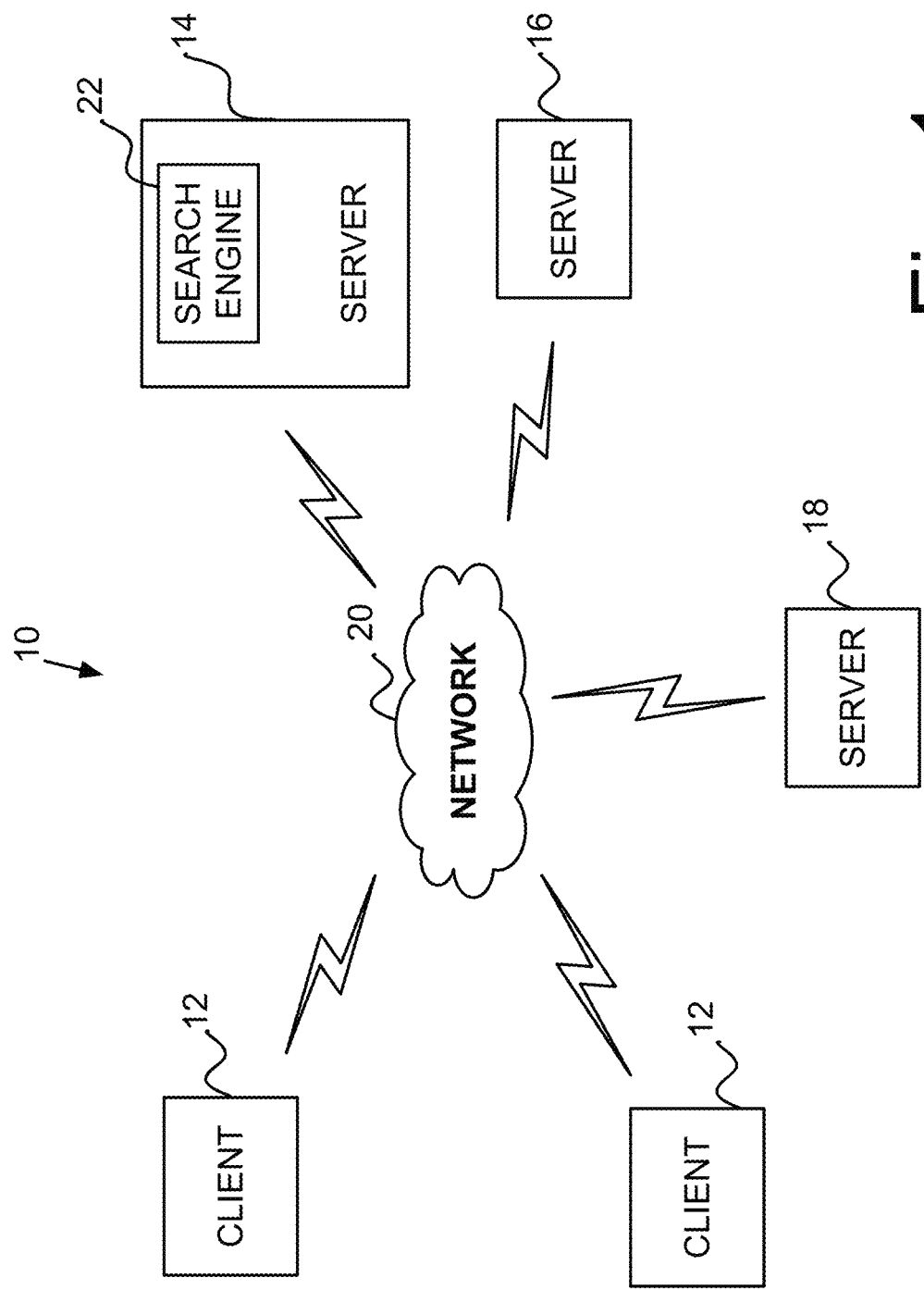
FIG. 1 is a schematic illustration of an exemplary network.

FIG. 1 illustrates an exemplary network 10 in which a system and a method, consistent with the present invention, may be implemented. The network 10 may include multiple client devices 12 connected to multiple servers 14, 16, 18 via a network 20. The network 20 may include a local area network (LAN), a wide area network (WAN), a phone network, such as the Public Switched Phone Network (PSTN), an intranet, the Internet, Wi-Fi, WiMAX or a combination thereof. Two client devices 12 and three servers 14, 16, 18 have been illustrated as connected to network 20 for simplicity. In practice, there may be more or less client devices and servers 14, 16, 18. Also, in some instances, a client device 12 may perform the functions of a server 14, 16, 18 and a server 14, 16, 18 may perform the functions of a client device 12.

The client devices 12 may include devices such as mainframes, minicomputers, personal computers, laptops, personal digital assistants, phones, or the like, capable of connecting to the network 20. The client devices 12 may transmit data over the network 20 or receive data from the network 20 via a wired, wireless, or optical connection.

The servers 14-18 may include one or more types of computer systems, such as a mainframe, minicomputer, or personal computer, capable of connecting to the network 20 to enable servers 14-18 to communicate with the client devices 12. In alternative implementations, the servers 14-18 may include mechanisms for directly connecting to one or more client devices 12. The servers 14-18 may transmit data over the network 20 or receive data from the network 20 via a wired, wireless, or optical connection.

In an implementation, consistent with the present invention illustratively embodied herein, the servers 14-18 may include a search engine 22 usable by the client devices 12. The servers 14-18 may store documents 200, such as web pages, accessible by the client devices 12.

Figure 2:
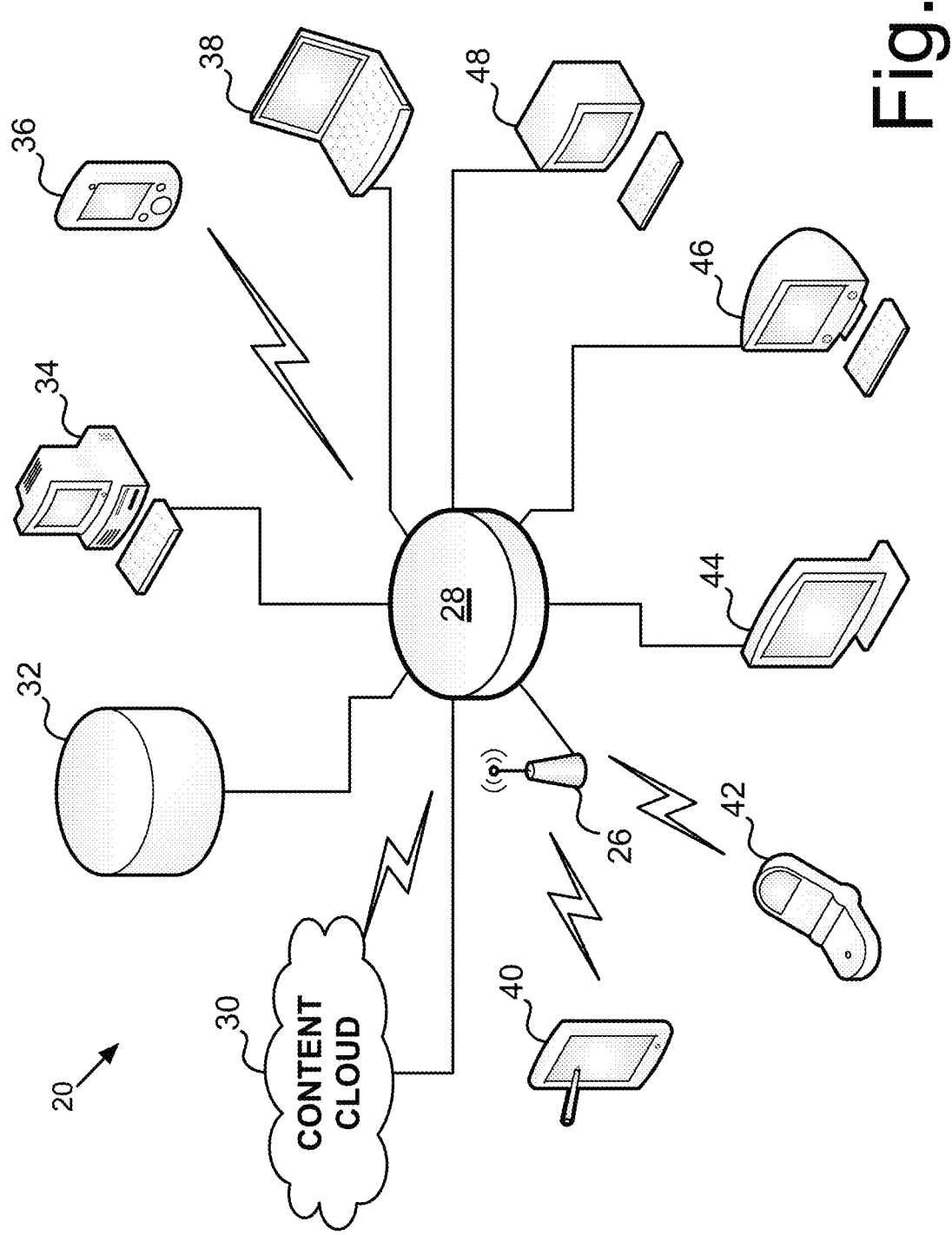
FIG. 2 is a schematic illustration of an alternate exemplary network.

With reference to FIG. 2, a network 20 includes the content cloud 30, a content database 32, content devices 34-38, and other devices 40-48. The network mediator 28 enables network devices 34-48 to communicate with each other without pre-configuring each device 34-48. The content cloud 30 represents a content source such as the Internet, where content exists at various locations across the globe that could be reached through a wired connection and/or with a wireless connection provided by an antenna 26. The content includes multimedia content such as audio and video. The mediator 28 allows the content cloud to provide content to devices 34-48. The database 32 is a storage device 166 that maintains content. The database 32 may be a standalone device on an external communication network. The mediator 28 communicates with the database 32 to access and retrieve content. The content devices 34-48 include intelligent devices, such as, for example, personal computers, laptops, cell phones and personal digital assistants. The content devices 34-48 are capable of storing content data. The devices 34-48 are intelligent devices that receive content from other content devices 30-48. However, the devices 34-48 can also operate as servers to distribute content to other client devices if desirable.

Exemplary Client Architecture

The following discussion provides a brief, general description of an exemplary computer apparatus in which at least some aspects of the present invention may be implemented. The present invention will be described in the general context of computer-executable instructions, such as program modules 174 being executed by a computerized device. However, methods of the present invention may be affected by other apparatuses. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be implemented with other configurations, including hand-held devices, multiprocessor system, microprocessor-based or programmable consumer electronics, network computers, minicomputers, set top boxes, mainframe computers, gaming consoles and the like. At least some aspects of the present invention may also be carried out in distributed computing environments where tasks are performed by remote processing devices linked through a communications network as exemplified in FIG. 2. In a distributed computing environment, program modules 174 may be located in local and/or remote memory storage devices 166.

Figure 3:
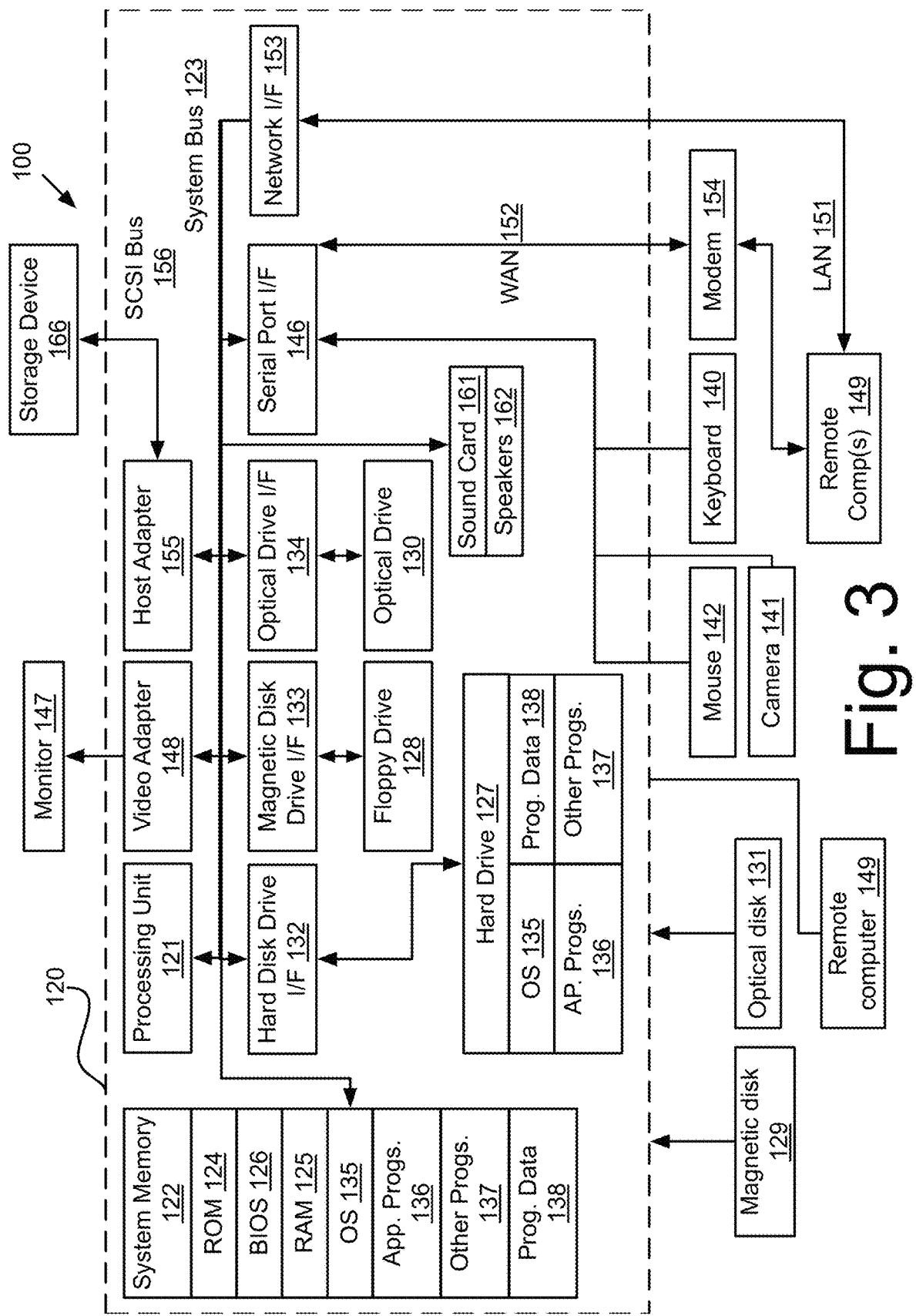
FIG. 3 is a schematic illustration of an exemplary computer system.

With reference to FIG. 3, an exemplary apparatus 100 for implementing at least some aspects of the present invention includes a general-purpose computing device in the form of a computer 120 or in the form of a computerized portable apparatus. The computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer data between elements within the computer 120, such as during start-up, may be stored in ROM 124. The computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine-readable instructions, data structures, program modules 174 and other data for the computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), remote cloud storage and the like, may be used instead of, or in addition to, the storage devices 166 introduced above.

A number of program modules 174 may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as Alice™, which is a research system developed by the User Interface Group at Carnegie Mellon University available at www.Alice.org, OpenGL® from Silicon Graphics Inc. of Mountain View Calif., or Direct 3D from Microsoft Corp. of Bellevue Wash.), and/or program data 138 for example.

A user may enter commands and data into the computer 120 through input devices, such as a keyboard 140, a camera 141 and a pointing device 142. Other input devices (not shown) such as a microphone, joystick, game pad, satellite dish, scanner, a touch sensitive screen, accelerometers or a motion-sensor detector such as KINECT™ that are adapted to sense movements of the user or movements of a device, or the like, may also be included. These and other input devices are often connected to the processing unit 121 through a serial port interface 146 coupled to the system bus 123. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device 150 may also be connected to the system bus 123 via an interface, such as a video adapter 148 for example. The video adapter 148 may include a graphics accelerator. One or more speakers 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the computer 120 may include other peripheral output devices (not shown), such as a printer, a hi-definition television and a scanner for example. As an alternative or an addition to the video monitor 147, a stereo video output device, such as a head mounted display or LCD shutter glasses for example, could be used.

The computer 120 may operate in a networked environment defining logical connections to one or more remote computers 120, such as a remote computer 149. The remote computer 149 may be another computer 120, a server 14-18, a router, a network PC, a peer device or other common network node, and may include many or all of the elements described above relative to the computer 120. The logical connections depicted in FIG. 3 include a local area network (LAN) 151 and a wide area network (WAN) 152, an intranet and the Internet.

When used in a LAN, the computer 120 may be connected to the LAN 151 through a network interface adapter (or "NIC") 153. When used in a WAN, such as the Internet, the computer 120 may include a modem 154 or other means for establishing communications over the wide area network 152 (e.g. Wi-Fi, WinMax). The modem 154, which may be internal or external, may be connected to the system bus 123 via the serial port interface 146 or another type of port interface. In a networked environment, at least some of the program modules depicted relative to the computer 120 may be stored in the remote memory storage device 166. The network connections shown are exemplary and other means of establishing a communication link between the computers 120 may be used through a host adaptor 155 coupled by a SCSI bus 156, for instance.

The exemplary network and the exemplary computer system described above are adapted to carry on the following embodiments:

The System

Figure 4:
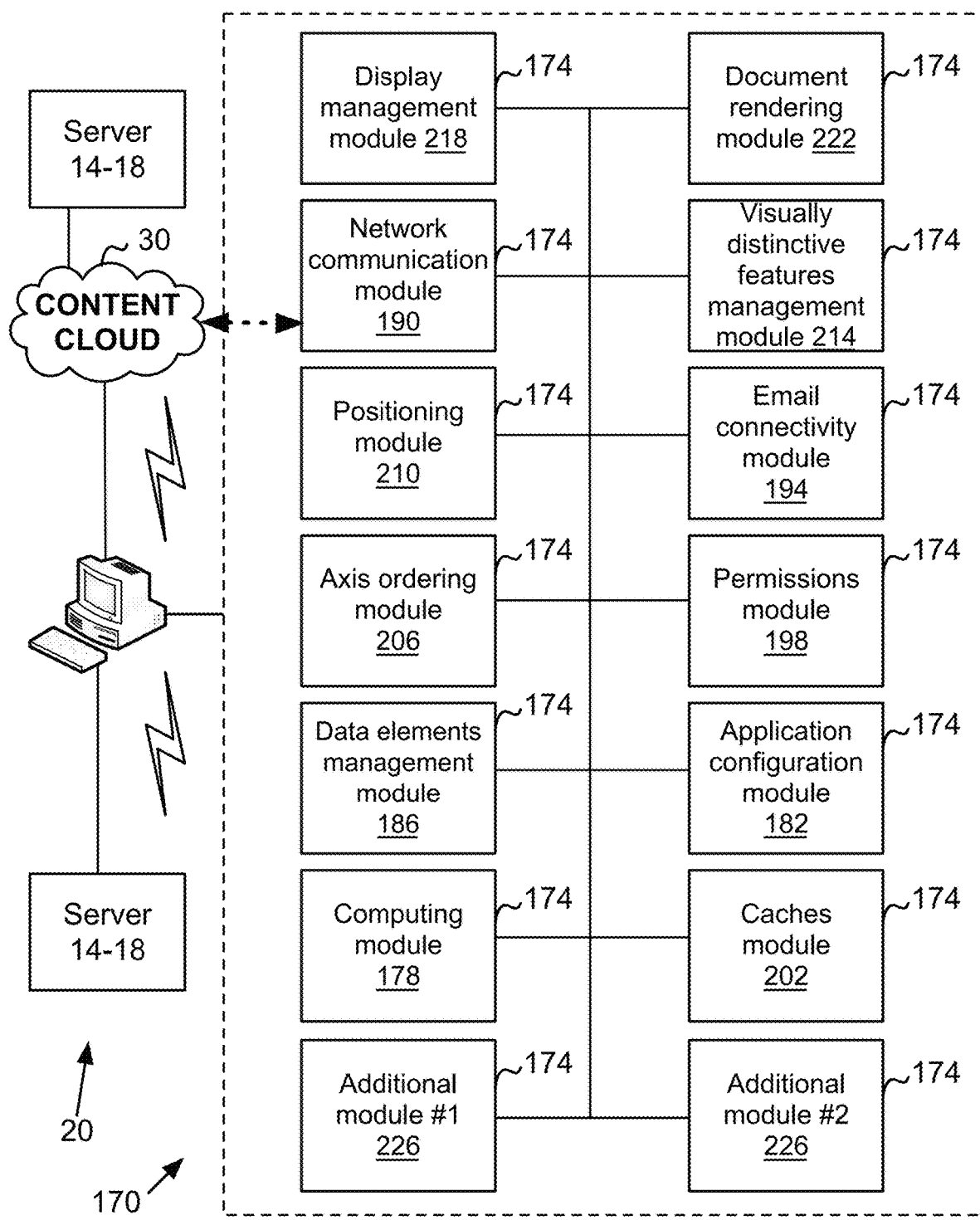
FIG. 4 is a schematic illustration of an exemplary software system.

A system 170 is depicted in FIG. 4 which may represent the functionalities described in the instant application when run on an apparatus 100, for instance a computer 120, such as has been previously described. The computer 120 may in turn be connected to a server 14-18 comprising a set of program modules 174 enabling functions including but not limited to: computing, document rendering, network communication, application configuration and local database management.

The software system 170 illustratively consists of a collection of at least twelve modules 174 independent from those of the server 14-18 that together carry out the method required for the functionalities to be visible on a graphical user interface and usable by the user. As illustrated, additional modules 226 may also be used in conjunction with the twelve base modules.

A computing module 178 provides a means to circulate data between users, the other modules 174 and the apparatus 100. The computing module 178 is adapted to convert queries 230, which may be system-based or user-based, into graphical rendering in accordance with at least one embodiment of the present invention. The other modules 174 are configured to send to and receive data from the computing module and to individually or collectively interact with other modules 174.

An application configuration module 182 provides software configuration to manage application settings and open connections to other servers 14-18. Other modules 174 may use the application configuration module 182 to manage their behavior to satisfy user-specific needs.

A data elements management module 186 may be used in conjunction with other modules to manage data elements such as documents 200 contained in a database 32 in response to a query 230. The data elements management module 186 may use any kind of database connection and may use a network communication module 190 in order to access a database 32 through a network 28, on a server computer 14-18. The network communication module 190 may use several protocols in order to communicate with a server computer 14-18, such as IPv4, IPv6, TCP, UDP, ODBC, HTTP, WebDAV, SSH, IMAP and even define its own specific communication protocol. The data elements management module 186 may also be used in conjunction with an email connectivity module 194 and network communication module 190 in order to treat and represent emails in the same way as the data elements of a database 32. The data elements management module 186 may also be used in conjunction with the permissions module 198 (on the client or server side) in order to control the user access to elements based by some sort of sharing rules. The data elements management module 186 may also work in conjunction with a caches module 202, providing client-side cached versions of the database 32 and files in order to respond to future requests faster. Modules 174 may be made to communicate information in a standardized way by the use of an Application Programming Interface (API) in order to simplify the data elements management module's 186 interactions with other modules 174.

The data elements management module 186 may sort through documents 200 stored in the database 32 and connected to each other via a variety of referencing modes, may apply a filter as specified in a query 230 and may subsequently direct the filtered documents 200 to other modules 174 (this will be shown in FIG. 6). One such module may be an axis-ordering module 206 which may distribute documents 200 filtered by the data elements management module 186 onto an axis-like array 288 or axis 292 (illustrated in FIG. 6) according to a collation function that may be user- or system-specified and analyzed by the computing module 178. An axis 292 or axis-like array 288 is an embodiment of graphical rendering of the functionalities described in the present specification on a device's display 150 that can be embodied as a substantially rectilinear sequence of documents 200 from which a viewer can infer meaning and/or relationships therebetween. An axis 292 or axis-like array 288 is adapted to accommodate and display a single type of documents 200 or, if desirable, more than one type of documents 200, computer files, multimedia contents, user-selectable elements and/or user-selectable menu elements. Generally, an axis 292 is used to graphically group information elements 200 having a commonality. Other functionalities related to axes 292 shall be described in greater detail below.

The axis-ordering module 206 may manage the ordering of single documents 200 and/or several documents 200 assembled into document sets 220 onto one or more axes 292. In addition of managing the collation of documents 200 onto an axis 292, the axis-ordering module 206 may also manage the order of the documents 200 contained within secondary documents sets 232 or subsidiary axis 294 (illustrated in FIG. 7). The positioning module 210 manages the positioning of documents 200 within axes 240 based on interactions with other modules 174 processing the various elements contained in a query 230. The positioning module 210 is adapted to and may interpret data contained in document sets 228 generated by the data elements management module 186 in relationship to the query 230 to identify a location for a given document set 228 within the collation of an axis 292. Likewise, a visually distinctive features management module 214 is adapted to interpret data contained in documents 200 or document sets 228 generated by the data elements management module 186 in relationship to the query 230 to selectively apply one or more visually distinctive features 284 (illustrated in FIG. 7) to single documents 200 or document sets 228. Finally, a display management module 218 may, inter alia, manage elements related to the user interface 234, possibly interacting with a graphics card and a monitor 147. The display management module 218 may use a document-rendering module 222 that provide instructions to render specific documents 200, like images, text files, word-processing files, spreadsheet files, presentation files, etc. The document-rendering module 222 may also provide an API to let developers add their own extensions to provide renderers for other document types.

Figure 5:
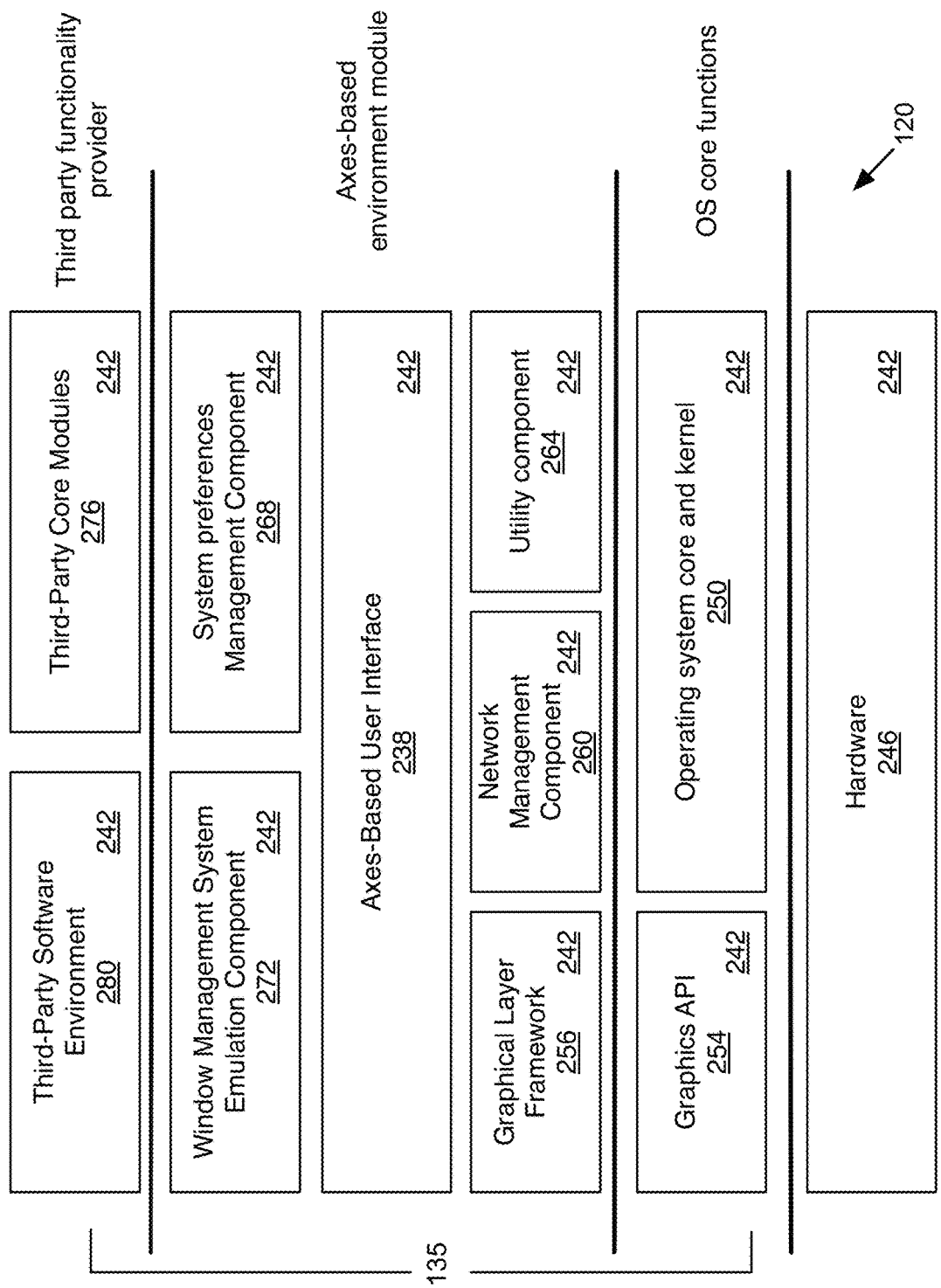
FIG. 5 is a schematic illustration of an axis-based interface and operating system.

FIG. 5 depicts a computer system 120 comprising an operating system 135 with an integrated axis-based user interface 238. As illustrated in FIG. 5, the axis-based user interface 238 could serve as a desktop environment to manipulate documents 200 (such as files, objects and applications), or could be used as a main operating system 135 user interface 234. One can appreciate a hierarchical description of a computer system 120 and software system 170 with multiple components 242. First, hardware 246 is used to provide users with a physical device 34-48. Second, the axis-based system could be built on top of an existing operating system core and kernel 250, such as, for instance, Unix™ or BSD™. A graphics API 254 like OpenGL® could be used also in order to provide basic graphical capabilities to the system via a video adapter 148.

Multiple core functionalities could be integrated to provide core operating system 135 services. A graphical layer framework component 256 could be built over the graphics API component 254, and could be used to provide complex drawing capabilities. The layer-based graphics layer framework component 256 may also support widgets rendering and handling (like buttons, text fields, dialogs, etc.) A network management component 260 could be based on pre-existing network management capabilities in the operating system core and kernel 250, and could be used as a tool to manage an Internet network connection through Ethernet, Bluetooth, Wi-Fi, Modem and other communication channels. A utility component 264 could handle all the other services needed to communicate with the operating system core and kernel 250, providing functionalities such as user login, user authentication, memory, disk-access management, etc. Using these modules, the axis-based user interface 238 would use core functionalities from the graphical layer framework component 256, the network management component 260 and the utility component 264 to provide workspaces 306 comprising multiple axes 292 that display documents 200 (not shown in FIG. 5). The axis-based user interface 238 may also provide more integrated actions, like interface buttons, preview or magnification that may be directly docketed. Another component, a system preferences management component 268 would provide multiple functions needed by the axis-based user interface 238, such as dialogs to manage document insertion, attribute definitions, users, permissions, application configuration, etc. Finally, the operating system 135 may comprise a window management system emulation module 272. This module may be based on an X Window System or XII© and may use other existing client application libraries to provide a large number of applications as well as functionalities to run windowed applications on top of the axis-based user interface 238. To provide other functionalities, third-party application providers could build third-party core modules 276 on top of the axis-based user interface 238 and system preferences management module 268. Third-party application providers could also develop third-party software environments 280 and other applications that could be run using the window management system emulation 272, providing the user with useful applications such as an Internet Browser, Office Business Applications, Multimedia Applications, Games, etc.

The Window Management System Emulation 272 could also provide functions to provide a more axis-based user interface 238 integration, such as, for example, previews, player and editors for the documents 200 displayed in the axis-based user interface 238. For example, a rich text document 200 could use a third-party module 276 or third-party software environment 280 to provide a previewer or media player for the document 200, or a third-party application to integrate a live editor on the axis-based user interface 238.

This computer system 120 could be used, for instance, as a business solution to provide users with an axis-based user interface 238 operating system 135 directly on multiple kinds of devices 34-48 (computers, laptop, tablets, cell phones, etc.). The computer system 120 may also illustratively be used as a business solution to sell preconfigured devices 34-48 with the axis-based user interface 238. Since the operating system 135 has a built-in axis-based user interface 238, the device 34-48 is likely to have a display 150 and other input devices like a keyboard 140, a mouse 142 or a touch-screen interface. The devices 34-48 may not necessarily provide such parts and may be adapted to be used by communicating information about the user interface 240 and input methods with other devices 34-48 (television set, motion sensing input device, computer or tablet over network, cell phone, etc.)

The Interface

Figure 6:
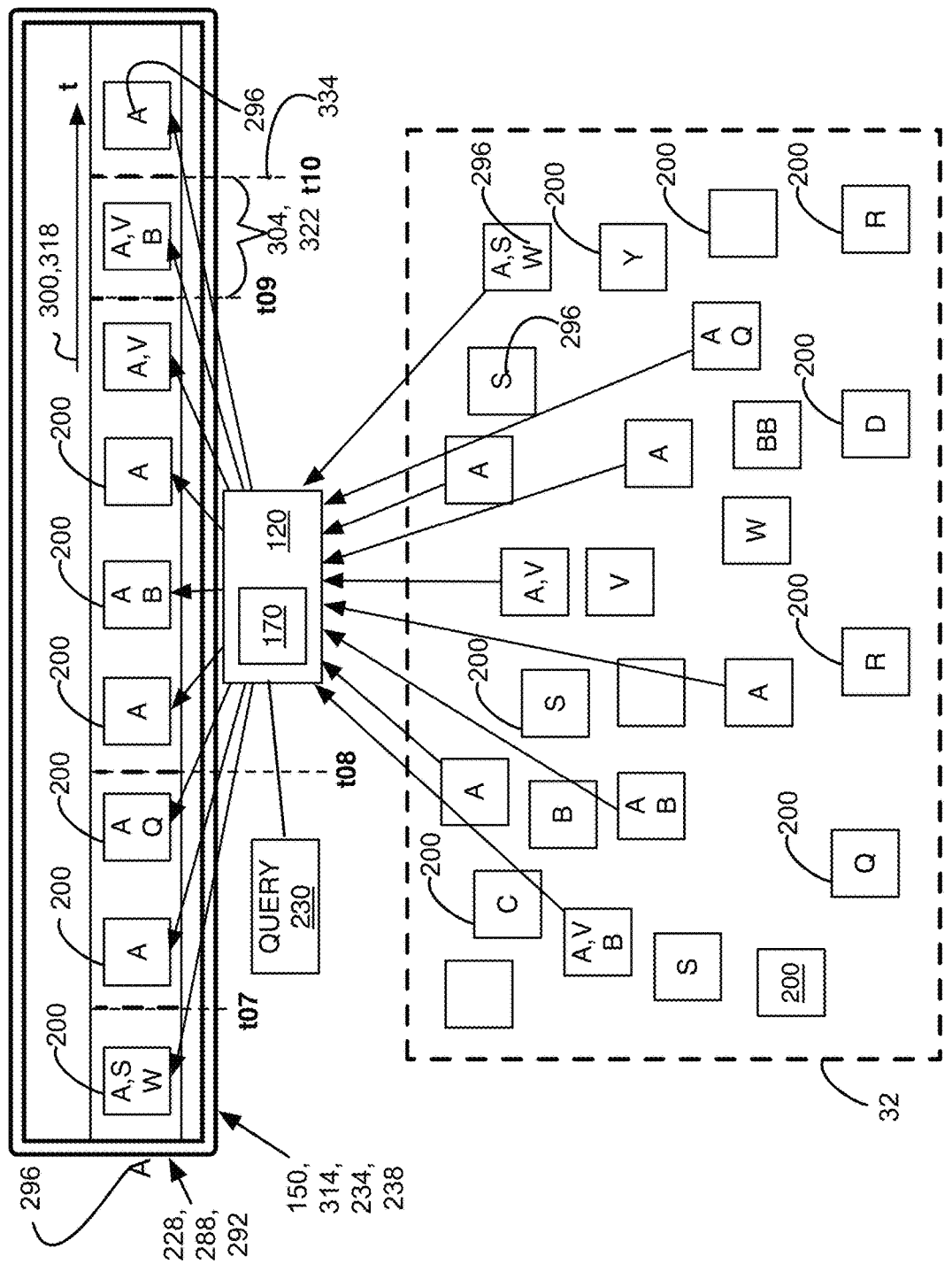
FIG. 6 is a schematic illustration of an exemplary layout of information elements.

FIG. 6 illustrates the interaction of the computer system 120 and software system 170 with an axis-based graphical user interface 238. An interface program providing a graphical user interface 234 for managing information elements 200 in accordance with an embodiment of the invention is installed on a machine, e.g. a computer system 120 as illustrated in FIG. 3. The interface 234 can be programmed using various programming languages e.g. C++, Java or other suitable programming languages. Programming of these languages is well known in the art and is adapted to be stored on a machine-readable medium and readable therefrom to provide executable instructions to a hardware system. It is believed that a skilled reader in software art is going to recognize this portion of the system that will therefore not be further described herein.

The graphical user interface 234 may run through the operating system 135 and the hardware 246 of the computer system 120 or, alternatively, through a network-based system e.g. client-server, and/cloud computing system as exemplified in FIG. 1 and FIG. 2. The interface 234 is adapted to display and manage information elements 200, generally provided on a basis of a query 230, which may be stored in one or many databases 32 (as illustrated in FIG. 6) that might be distributed in a combination of locations (e.g. multiple databases, web, cloud, etc . . . ). Information elements 200 may include computer files, pictures, multimedia content, applications (i.e. computer programs), menu elements, sets of icons and/or other user-selectable elements, all of which shall henceforth be indiscriminately referred to as documents 200 to lighten the text without limiting the scope of the present invention.

An axis-based graphical interface 238 is adapted to graphically structure documents 200 in arrays 288 that arrange the documents 200 in rows and/or columns in a reasonably regular fashion and to allow navigation thereof by the user further to a query 230. The axis-based layout and ordering is adapted to provide the user with information about the content of each document 200, its meaning and its relationships to the other documents 200 disposed on the axis 292. Navigation tools are provided with the axis-based user interface 238 to allow navigation through the documents 200 of a single axis 292 and of various axes 292 when a plurality of axes 292 is enabled. The display of documents 200 on an array 288, or axis 292, therefore allows contextual management of documents 200 as a flow, or an ongoing rational sequence of documents 200. An axis-based interface 238 thus helps to intuitively display a group of documents 200 and facilitate understanding and managing of large sequences of documents 200 bearing a relation.

In a simplified exemplary form, an array 288 may be embodied as an axis of documents 292 (hereinbelow referred to as axis 292 to lighten the text), which groups documents 200 in a single row or column, as illustrated in FIG. 6. An axis 292 can be embodied as a substantially rectilinear arrangement of documents 200 adapted to dispose each document 200 on a straight or curved line, in various embodiments thereof. The axis 292 can be embodied as completely straight (rectilinear), slightly curved, substantially curved, circular, angled, following a particular shape or have a consistent shape over which documents 200 are disposed in a reasonably consistent fashion. The exact shape of the axis 292 can vary as well as its disposition—horizontal, vertical or other—in relation to the device's display 150. What matters, inter alia, is that the layout structure of an axis 292 provides a sequence of documents 200 from which a viewer can infer meaning, logical connections, contextual location, and/or relationships.

The axis 292 can be represented as a single axis 292, a double axis 292, or more axes 292. Axes 292 may be independent from one another (using distinct scales, or orderings, henceforth referred to as collation functions 300) or may form a group of axes 310 by sharing the same scale or collation function 300. Also, a document 200, attribute 296 or other property of an element contained in an axis 292 can be selected and used as a logical connector to create an additional axis 292 from an existing axis 292. This subsidiary axis 294 is meant to be temporary in some embodiments, serving as a way to view a specific set of additional documents 200 or highlight certain documents 200 from the original axis 292 without having to alter the entire workspace 306. It may originate from the logical connector document 200, or information element 200, and be disposed in non-parallel fashion thereto. The subsidiary axis's 294 position is preferably orthogonal to the original axis 292 but the angle may vary. Like axes 292, logically connected subsidiary axes 294 may be scrollable. More such logically connected subsidiary axes 294 can subsequently be created in the same fashion. Navigation among axes 292 and subsidiary axes 294 could be called "relational navigation".

Axes 292 may be disposed horizontally and/or vertically. Groups of axes 310 may be presented using one of the layouts or combining both. The axes 292 presented in the embodiments below are generally illustrated in the horizontal layout configurations. However, they could, all or in majority, be disposed vertically without departing from the scope of the present disclosure. Other possible graphical layouts of documents 200 might become obvious to a skilled reader in light of the present application and would be considered within the scope of this application.

When only a portion of the axis 292 is visible, a play of zoom, pan and scrolling movements along the axis 292 allows a user to navigate the axis 292 and change the series of documents 200 that is displayed in the display area 314 of the display 150. Scrolling movements can be performed in a variety of ways including but not limited to click-and-drag, pressing on the keys of a keyboard, gesturing to a motion-sensor or on a touch-screen.

Documents 200 might overlap or decrease in size to fit or maximize the space available in the display area 314 in embodiments thereof. Selected documents 200 on an axis 292 can be magnified to increase the level of detail shown. Similarly, a small display area 314 could display only one document 200 out of the entire axis 292. The remaining documents 200 would not be displayed in the display area 314 but would yet remain at their respective "virtual" position on the axis 292, ready to be displayed upon scrolling the axis 292. In other words, if we consider a mobile platform like a mobile phone having a small display 150, the small display 150 might only allow to efficiently display one document 200 or a few documents at a time. However, the displayed document 200 being part of an axis 292, the other documents 200 on the axis 292 would remain displayable in accordance with their respective position on the axis 292 when the axis is scrolled, navigated, gestured.

The documents 200 are selected to be disposed on the axis 292 based on one or more attributes 296, and are ordered thereon according to a collation function 300, namely an ordered arrangement made by comparison, e.g. a chronological order adapted to use a time scale 318. The attribute(s) and collation function parameters are specified in a query 230 that may be run by a user or by an automated function of the system. Indeed, each axis 292 groups documents 200 in accordance with, for example, a selected tag, category, keyword, document creator, or other attribute 296 that expresses a characterization of one or more document(s) 200 and that are configurable to represent intrinsic or extrinsic characteristics. The term "attribute" 296 will generally be used throughout the instant specification to lighten the reading of the text and will encompass other document properties or means for establishing commonality or relationships as described above unless otherwise specified.

Attributes 296 may be user-specified or system-specified. Generally, documents 200 bear a plurality of attributes 296 assigned by one or more user(s) (e.g. keyword, subject, project, creator, category, etc.), and a plurality of attributes 296 that are assigned by the system, such as, illustratively, file type, time of creation, number of views, time of last modification, file size, etc. Given the broad range of applicability of the present invention, the attributes 296 that may be assigned by the system and user, as well as the attributes 296 that can be desirable to use in the management of axes 292 might substantially vary from one field or user to another and however remain within the scope of present specification.

The selection of one or more attributes 296 (using Boolean logic for instance) in a query 230 determines which documents 200 will be displayed on the axis 292. If no specific attribute 296 is selected, the axis 292 will display all documents 200 in a default order, like the date of creation thereof. Thus, all documents 200 on the same axis 292 are normally associated with the selected set or combination of attributes 296 that are used as parameters for the axis 292. Third-party data, like publicity or user-targeted information, could also be added to an axis 292, either arbitrarily or according to user information, filtering and/or existing collation of axes 292 without departing from the scope of the present invention.

The documents 200 illustrated in FIG. 6 feature attributes 296 individually represented by a capital letter thereon, or none, in which case the documents 200 are left blank. Letter attributes 296 are used in the present application for illustrative purposes only while letter attributes are theoretically possible, more descriptive attributes 296 such as those described above are used in embodiments of the present invention. As it is shown in FIG. 6, any document 200 can simultaneously feature multiple attributes 296, some user-specified and others system-specified. In fact, a preferred embodiment of the invention assigns a plurality of attributes 296 to every document 200. Other documents 200 illustrated on FIG. 6 are blank, or without any associated attribute 296, illustrating documents that could theoretically not be assigned any attribute 296, but that could nonetheless be created and found in a query 230 (e.g. a query 230 that would select all documents 200 contained in the database 32).

The query 230 in FIG. 6 here illustratively filters and selects documents 200 from the database 32 based on attribute 296 'A' for display on the axis 292. FIG. 6 further illustrates that the documents 200 selected from the database 32 by the query 230 are placed on the axis 292 in chronological order 318, another parameter that could be specified in the query 230. Indeed, an axis 292 also generally disposes the documents 200 resulting from the query 230 in accordance with a specified order or collation function 300, (e.g. chronological order, alphabetical order, statistical order, increasing file size, origins names, etc.). A collation function 300 might include dividing the axis 292 into successive collation units 304 (e.g. time units 322 in the case of a chronological order, which can illustratively be hours, days, months, years, etc . . . ) that can be graphically illustrated with a separation or separations along the axis 292. A collation function 300 would thus dispose each document 200 along the axis 292 according to the value of a specified attribute 296 in relation to the collation units 304 of the axis 292 and the other documents 200 of the selected document set 228. Among collation functions 300, a chronological distribution of documents 200 on a time scale 318 is used in most embodiments of our work because of its intuitiveness (because any action or event takes place at a specific time and usually in sequence with other events or actions). Documents are therefore associated with a respective collation position, optionally in a collation unit. While an axis 292 disposing documents in random fashion is also contemplated within the scope of the present specification, axes 292 disposing documents 200 according to a collation function 300 are illustrated embodiments because of the usefulness of ordering documents 200.

Figure 7:
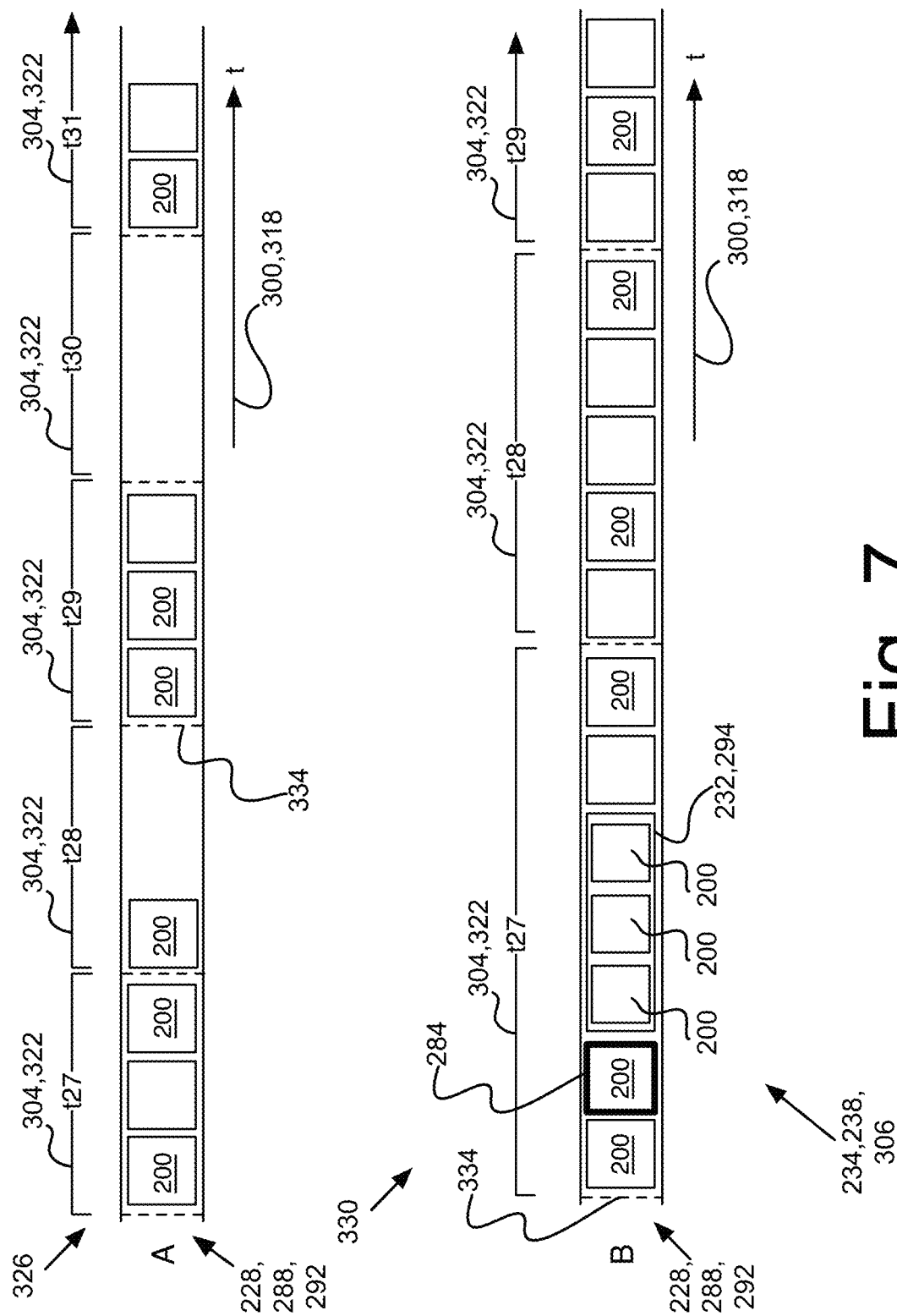
FIG. 7 is a schematic illustration of an exemplary layout of information elements using a linear timescale and a non-linear timescale.

An axis 292 or a group of axes 310 may be embodied in a linear configuration 326 or a non-linear configuration 330. Both configurations are illustrated in FIG. 7 in a generic example. As can be appreciated from FIG. 7, linear configuration 326 displays collation units 304 of the same graphical longitudinal size regardless of the number of documents 200 contained in each collation unit 304. The size of the documents 200 located within a given collation unit 304 can optionally be adjusted in accordance with the number of documents 200 located therein. For instance, documents 200 will be larger if there are few documents 200 in the collation unit 304 and smaller if many documents 200 are found therein. Alternatively, the documents 200 can remain the same size and can overlap, or be stacked, when their quantity exceeds the available space. Another possible way of making large numbers of documents 200 fit into a fixed-size collation unit 304 is to equip the collation unit 304 with a scroll bar allowing the user to navigate the collation unit 304 to reveal hidden documents 200. This also means that documents 200 in a linear configuration 326 may be displayed as an uneven sequence from a graphical point of view. Ultimately, a collation unit 304 in a linear configuration containing no document will appear as empty, or as a blank space on the display 150, but will still be the same size as the other collation units 304 of the axis 292.

Conversely, the non-linear configuration 330 displays collation units 304 of uneven longitudinal sizes because an even distribution of documents 200 along the axis 292 prevails over the linearity of the collation. In other words, document 200 size and a constant flow of documents 200 along the axis 292 are given primacy over having collation units 304 of equal graphical size. This provides a more efficient use of the space on the axes 292 but may provide less meaning to illustrate an evolution along time.

Figure 8:
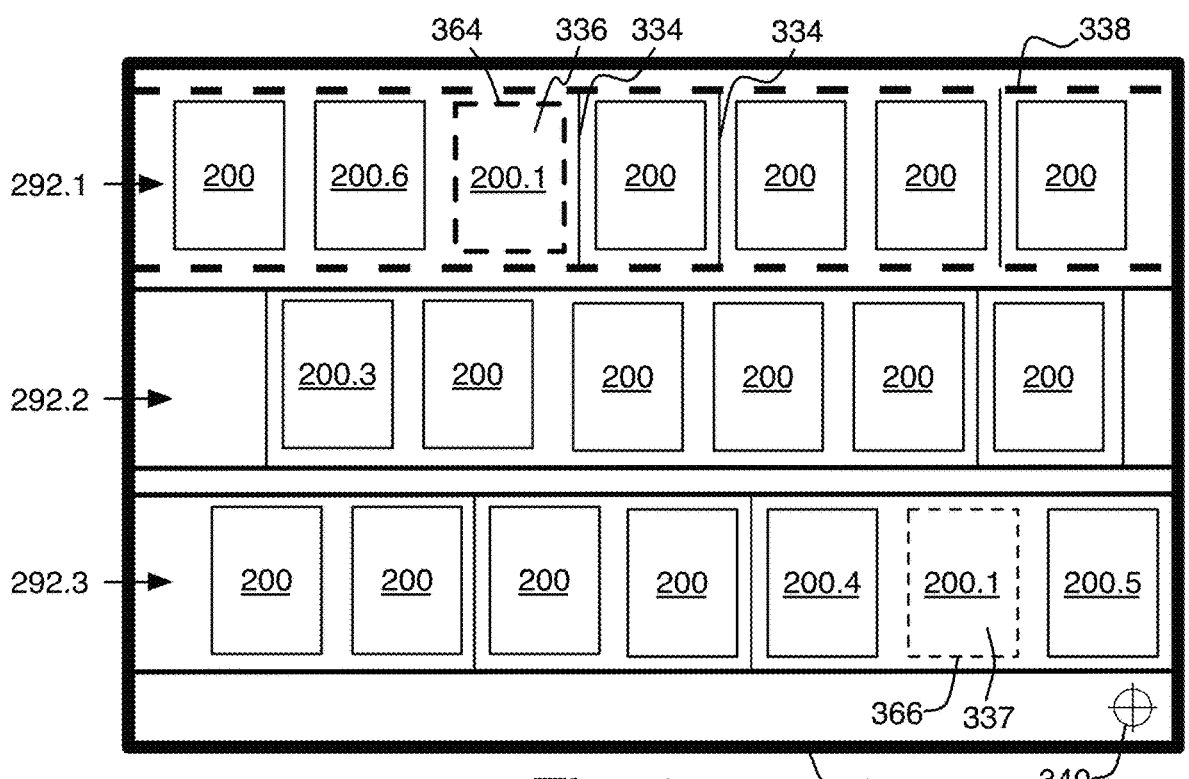
FIG. 8 is a schematic illustration of a display area comprising multiple axes of documents disposed in a longitudinal and parallel arrangement with an active document and another instance thereof in accordance with an exemplary embodiment of the present invention.

FIG. 8 illustrate a display area with three axes 292 with multiple documents 200 thereon. The document 200.1 in axis 292.1 has an active document border 364, which is used as a distinction from other documents 200 so a viewer may appreciate the location of the active document 336. The active document 336, 200.1 is used to give the user options to interact with the active document 336 with functions such as "open document", "download document", "edit document's attributes", "delete document", etc. for example. Documents 200 may be active and/or selected. In the embodiments, only one document 200 may be considered active at a given time, while multiple documents 200 may be considered selected at a given time. When a document 200 became an active document 336, it replaces the previous active document 336. The active document 336 may use a border like an active document border 364 to be distinguishable, but could also use other visual distinctions, such as a coloration, a visual effect or an animation.

In embodiments, the axis 292.1 is considered an active axis 338 since it contains the active document 336. If another document 200 over another axis 292 is activated, this document 200 will become the new active document 336 and its axis 292 will become the new active axis 338. The active axis 338 may use a visual effect to be distinguishable, such as bolder borders, a coloration, a coloration, a visual effect or an animation, for example.

In the embodiments, we use documents 200, but axes 292 are not limited to the sole use of documents 200, information element may be database entries, contact information, web links, notes, log entries, etc.

Still in FIG. 8, one can appreciate the presence of another document 200.1 on the axis 292.3, which is another instance of the active document 337. A document 200 may be shown in multiple axis 292 at once, each one is described as a different instance of a document 200. In the example of FIG. 8, the second instance of 200.1 is not considered as the active document 336. Another occurrence document border 366 may be used to help the user appreciate that another instance of the active document 337 of axis 292.1 is visible in the display area 314. Since axes 292 can be scrolled, some other instances of the active document 337 may appear in portions of axes 292 not shown on the display area 314 or on other axes that may not be visible on the display area 314.

Finally, an aligning tool 340 is exemplary shown at the bottom right of the display area. In the current embodiment, the aligning tool 340 is user-selectable and the user may use a pointing device 142 to enable its functionality. The shape and position of the aligning tool 340 may vary, or the function may be triggered through another way such as a keyboard shortcut, a mouse or touchscreen gesture, a menu option, a vocal command, eyes-sight, etc. In our example, the aligning tool 340 is used to trigger the "centering" functionality, that is one of the embodiments of the present invention.

Figure 9:
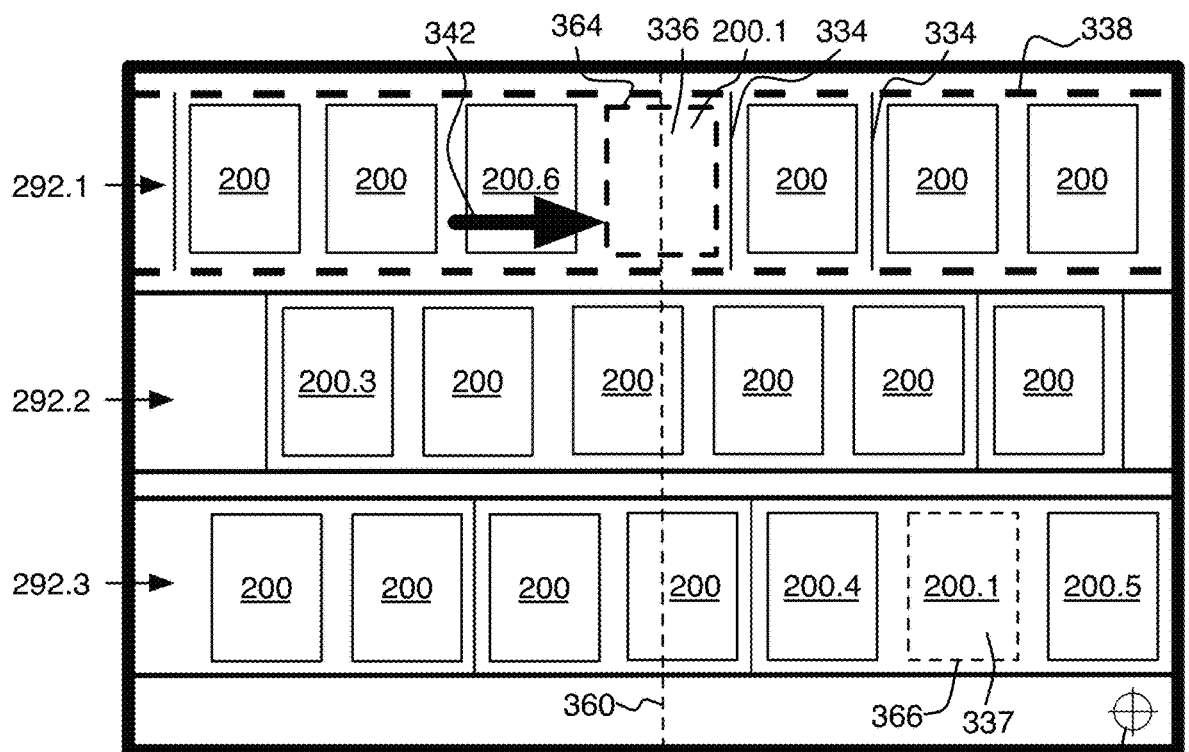
FIG. 9 is a schematic illustration of a display area comprising multiple axes of documents disposed in a longitudinal and parallel arrangement with an active document and another aligned instance of the active document in accordance with an exemplary embodiment of the present invention.

FIG. 9 illustrates possible results of a mouse over, or other means to select the aligning tool 340. In embodiments of the current invention, the aligning tool 340 scrolls, or displaces, the active document 200.1 of axis 292.1 along the longitudinal direction of the axis to locate the active document 200.1 at the center of a viewing area of a display. The other documents on the axis are also scrolled accordingly along the axis. One can appreciate the axis scrolling movement indicated by arrow 342 of documents 200.1 on the first axis 292.1 while the documents on the other axes 292.2,292.3 did not move. The movement indicated by arrow 342 is representative of an axis 292 scrolling, hence all the documents 200 on the axis are translated to the right. For example, document 200.6 is still located before the active document 200.1 after the axis scrolling. The axis movement 342 may be animated, for example, by progressively moving the axis to a final position to help the user get an appreciation of the direction and amplitude of the movement. Also, one can appreciate that the time unit markers 334 have also translated accordingly with the scrolling 342 of the first axis 292.1. The actuation of the aligning tool 340 is illustratively centering the active document 200.1 of the first axis 292.1 near or at the center of the display area 314. The aligning tool 340 could also be positioned at other positions on the display area 314 on the screen. Other locations, such as the left or the right of the display area 314, for instance, could be used as a reference.

Figure 10:
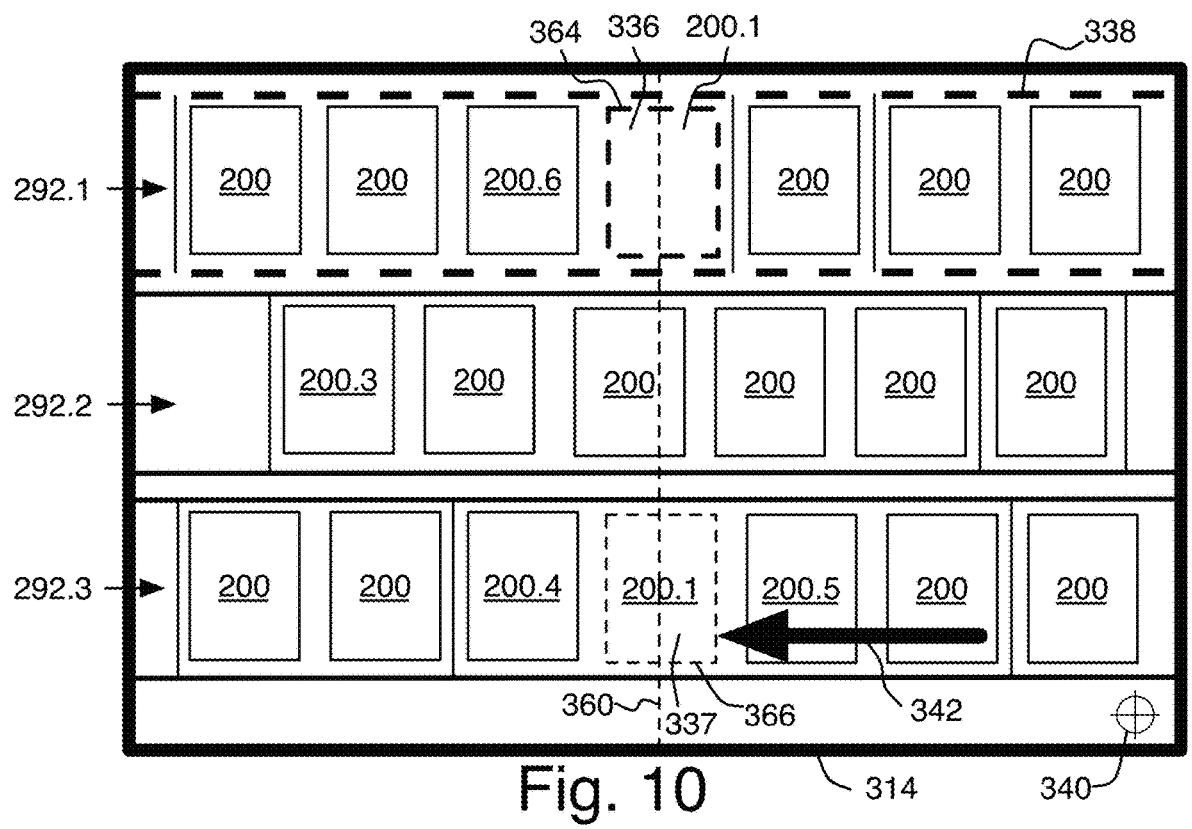
FIG. 10 is a schematic illustration of a display area comprising multiple axes of documents disposed in a longitudinal and parallel arrangement with an active document and another aligned instance of the active document in accordance with an exemplary embodiment of the present invention.

FIG. 10 shows another embodiment illustrating that axis 292.3 has a scrolling movement represented by arrow 342 that is an effect of the alignment function described above. The alignment function can be triggered in multiple ways, such as a keyboard shortcut, a mouse, a touchscreen gesture, a 3D movement, a menu option selection, a vocal command, etc. In the embodied example, the alignment function is triggered when the user activates the aligning tool 340 a second time. When this selection is made, the system detects that the active document 336, 200.1 of the axis 292.1 is already centered longitudinally on the display area 314 therefore triggering the centering function a second time is not useful. Alternatively, the second activation of the alignment function may trigger the alignment function as another function of the aligning tool 340. In this embodiment, the effect would align all the other occurrences of the active document 336, 200.1 longitudinally (horizontally in the present situation) at the center of the display area 314 in vertical alignment with the active document 336 to be easily retrieved in a graphical fashion. The alignment can be done programmatically through an axis scrolling movement 342 of the axis 292.3. In this embodiment, the axis 292.2 was not affected by the alignment function because no other occurrence of document 200.1 was found.

Figure 11:
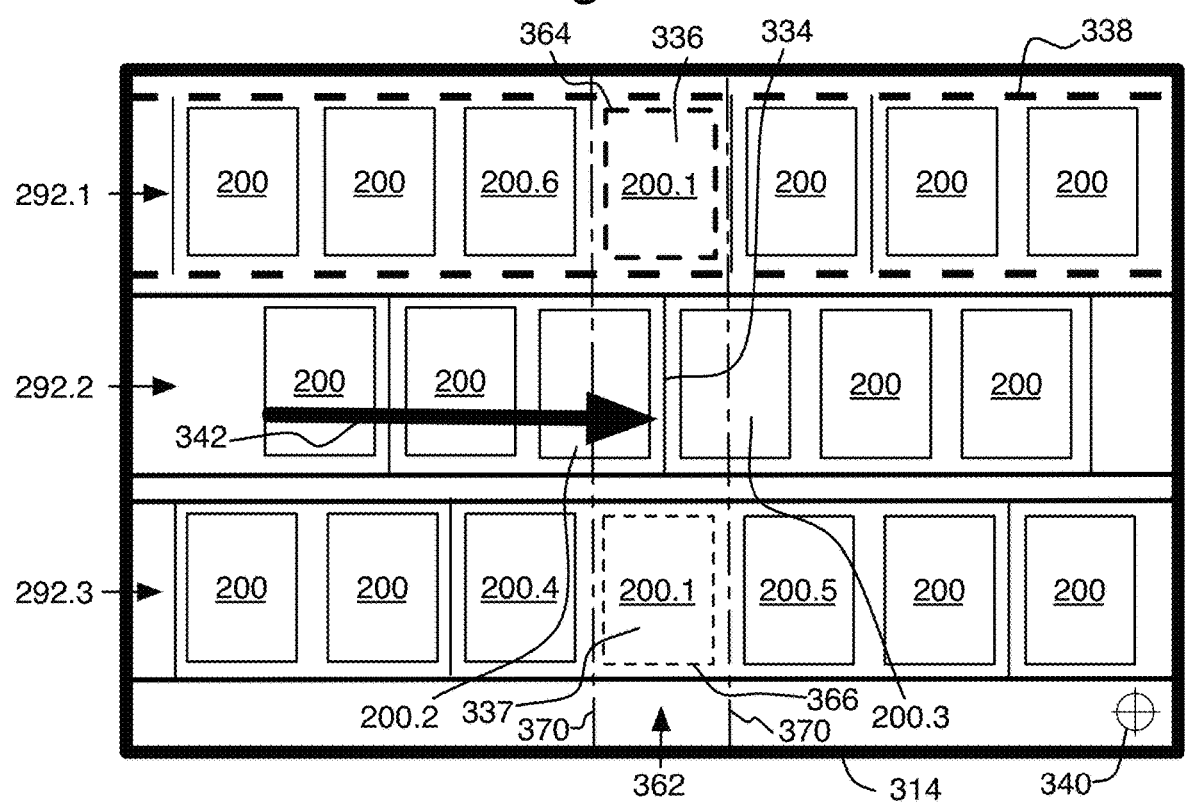
FIG. 11 is a schematic illustration of a display area comprising multiple axes of documents disposed in a longitudinal and parallel arrangement with an active document, another aligned instance of the active document and an aligned axis in accordance with an exemplary embodiment of the present invention.

The alignment function can help the user see or retrieve other instances of the active documents 336 present on other axes 292. It can also longitudinally align and vertically superpose other axes 292 where no instance of the active document 336 is found. In such axes 292 which, the longitudinal alignment could be done to vertically superpose the location along the axis representing the time where the active document 336 would be longitudinally aligned (horizontally in the present situation). By the effect of a collation function 300, the documents 200 may be chronologically sorted over an axis 292. Other collation functions are encompassed by the present application. By example, in FIG. 11, documents 200.4, 200.5 have incidence in time before and after the timely location of document 200.1. One can conceive that on the absence of another instance of the document 336 along the axis 292.2, knowing the location where the other instance of the document 336 would have been along the axis 292.2 could be useful. For example, the first axis 292.1 may show the activity of a first employee, while the second axis 292.2 may show the activity of a second employee. The user may want to see documents representing activities of the second employee at the same insertion time of the active document 336. This is shown in FIG. 11 where the alignment function would have affected the axis 292.2 by applying an axis scrolling movement 342 over it. One can appreciate how documents 200.2 and 200.3 are now located near a perpendicular alignment column 362 that will be described in further details below. This is because document 200.2 has been inserted before the insertion time of document 200.1 and document 200.3 was inserted after the insertion time of document 200.1. In the present situation, documents 200.2, 200.3 have been inserted in two different days, a time unit separator 334 is visible in-between.

Another embodiment is shown in FIG. 11, instead of a perpendicular alignment line 360 (illustrated in FIG. 10), the system can display a perpendicular alignment column 362, illustratively bordered by a pair of perpendicular and parallel borders 370 and define a width on the display area 314, to let the user see the alignment of document 200.1 and discriminate easily axis 292.2 where the active document 336, 200.1 is absent. By example, documents 200.2 and 200.3 on axis 292.2 are transversally aligned with document 200.1, letting the user know that the time or sequential order of document 200.1 is situated after document 200.2 and before document 200.3. If document 200.1 was matching the query of axis 292.2, it would have been located between document 200.2 and document 200.3. This document location can be easier to understand for the user when displaying an alignment column 362, or the like providing similar meaning.

Figure 12:
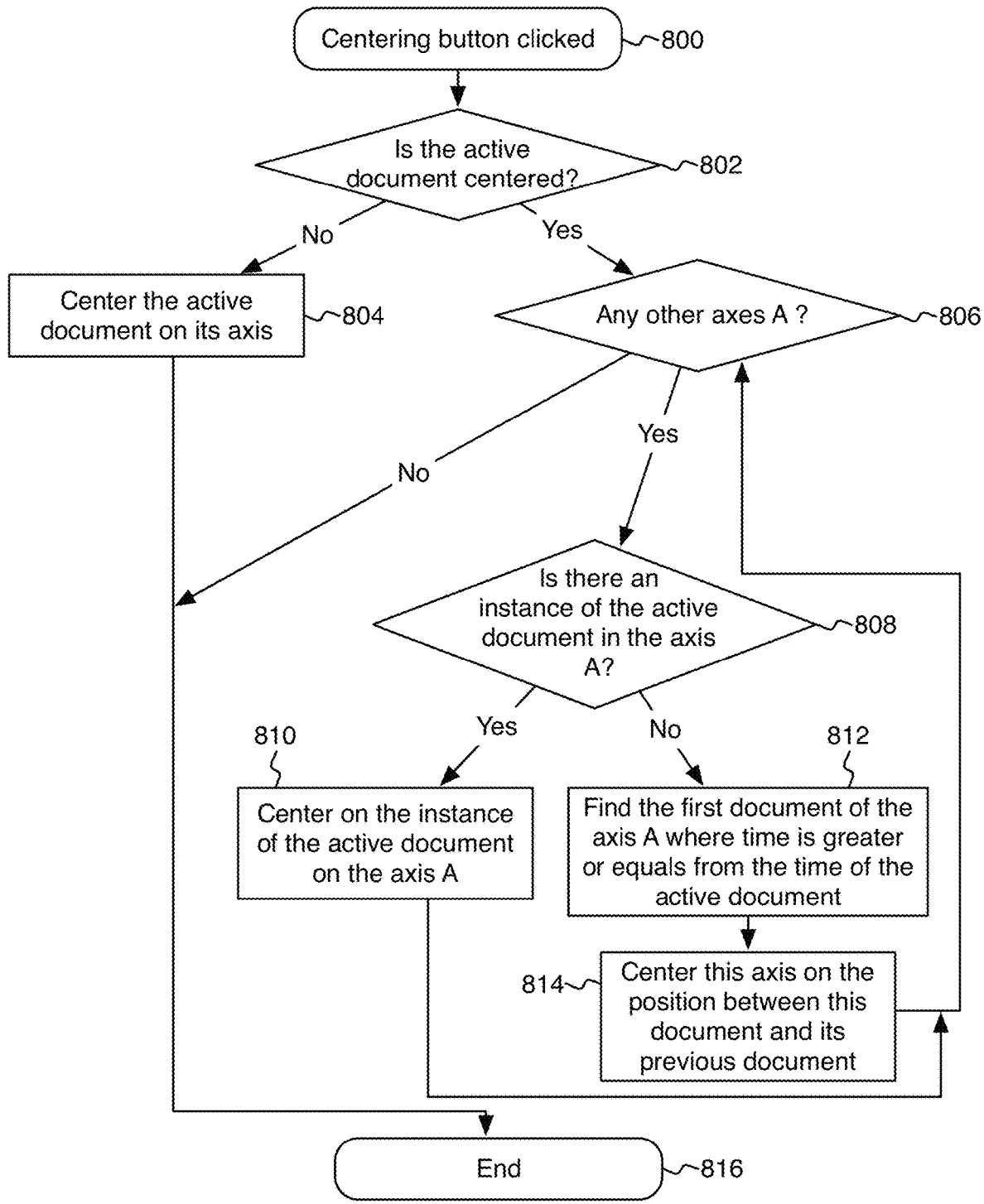
FIG. 12 is an exemplary flowchart describing an embodiment of the logic of the centering and the aligning functions in accordance with an exemplary embodiment of the present invention.

FIG. 12 is a flowchart, starting at the centering button activated step 800, and representing an illustrative behavior of the aligning tool. This flowchart will be using a variable A. A variable is a symbolic name referring to a value which may change during the processing of the flowchart. The variable A will get the values of different axes 292 present alongside with the active axis 338. The first step 802 is to determine if the active document 336 is already centered on its own axis 292. If it is not the case, the centering function is used in step 804, where the axis 292 gets scrolled so the active document 336 gets centered on the display area 314 and the flowchart ends at step 816. If the active document 336 was already centered, step 806 serves as a loop over each other axes. Variable A gets the value of each axis 292 other than the axis of the active document 336. In step 808, a test is done to see if there is an instance of the active document 337. If an instance of the active document 337 is found, step 810 programmatically scrolls axis 292 stored in variable A. This instance of the active document 337 should be longitudinally aligned at the center of the display area 314 along with the active document 336. If no instance of the active document 336 is found in the axis 292 stored in the variable A, step 812 sets a search over documents of the axis 292 stored in the variable A. This search look for the first document where the time is greater or equal than the one of the active document 336. This search can be done efficiently with the use of a binary search algorithm, by example. In step 814, the axis 292 of variable A is scrolled at the middle between the first document greater or equal to the active document 336, and its previous document. Steps 808-814 are executed again on all axes 292 stored in variable A, until they were all aligned. Then the test at step 806 would fail and the algorithm stops at step 816.

The triggering of the centering function and aligning function can be done by the user enabling the aligning tool 340 different number of times. In an alternate and unillustrated embodiment, the system may trigger the centering and/or aligning function automatically based on, illustratively, the use of another function or each time a document 200 is set as the active document 336.

Figure 13:
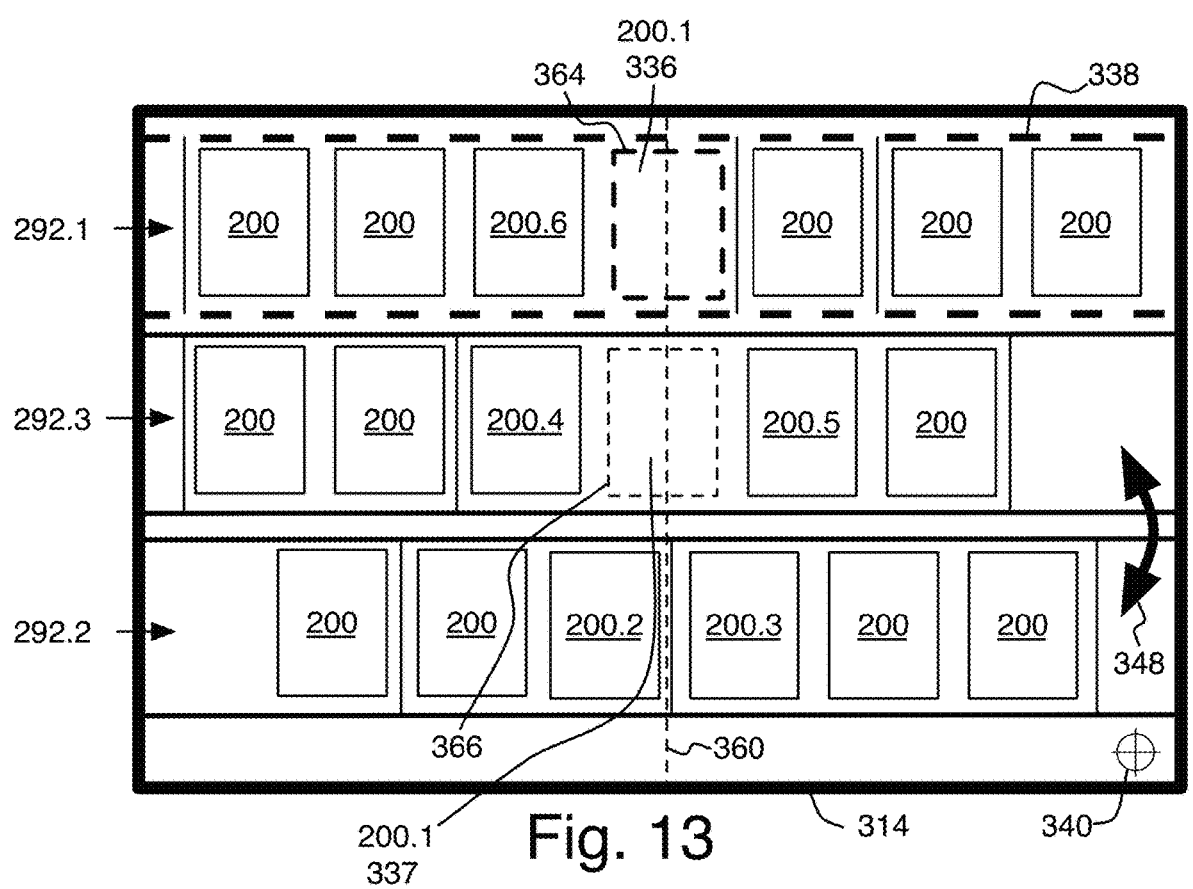
FIG. 13 is a schematic illustration of a display area comprising multiple axes of documents disposed in a longitudinal and parallel arrangement with an active document, another aligned instance of the active document and an aligned axis in accordance with an exemplary embodiment of the present invention.

Another embodiment is shown in FIG. 13, where, as a result of an activation of the aligning tool 340, axes 292.3 and 292.2 have been interchanged to accentuate the presence of document 200.1 on axis 292.3. The axis 292.2 has been moved farther from the active axis 292.1 since document 200.1 is absent from axis 292.2. This axis reordering function can be triggered at a same time as the alignment function, or as a third enablement action on the aligning tool 340. The axis reordering movement illustrated by arrow 348 can be animated to let the user understand that a reordering is happening. In an alternative but unillustrated embodiment, the axes 292 reordering function may move the axis 292.1, displaying the active document 200.1, at the top of the display area 314 or at the center of the display area 314 but can also leave its vertical position unchanged. If so, the reordering of the axes 292 may be made at the top of the active axis 292.1, 338 or at the bottom of the active axis 292.1. In this case, all upper axes 292 with an instance of the active document 337, 200.1 thereon are moved toward the bottom of the display area 314 before the active axis 338, and all lower axes 292 with an instance of the active document 337, 200.1 are moved up next to the active axis 292.1.

Figure 14:
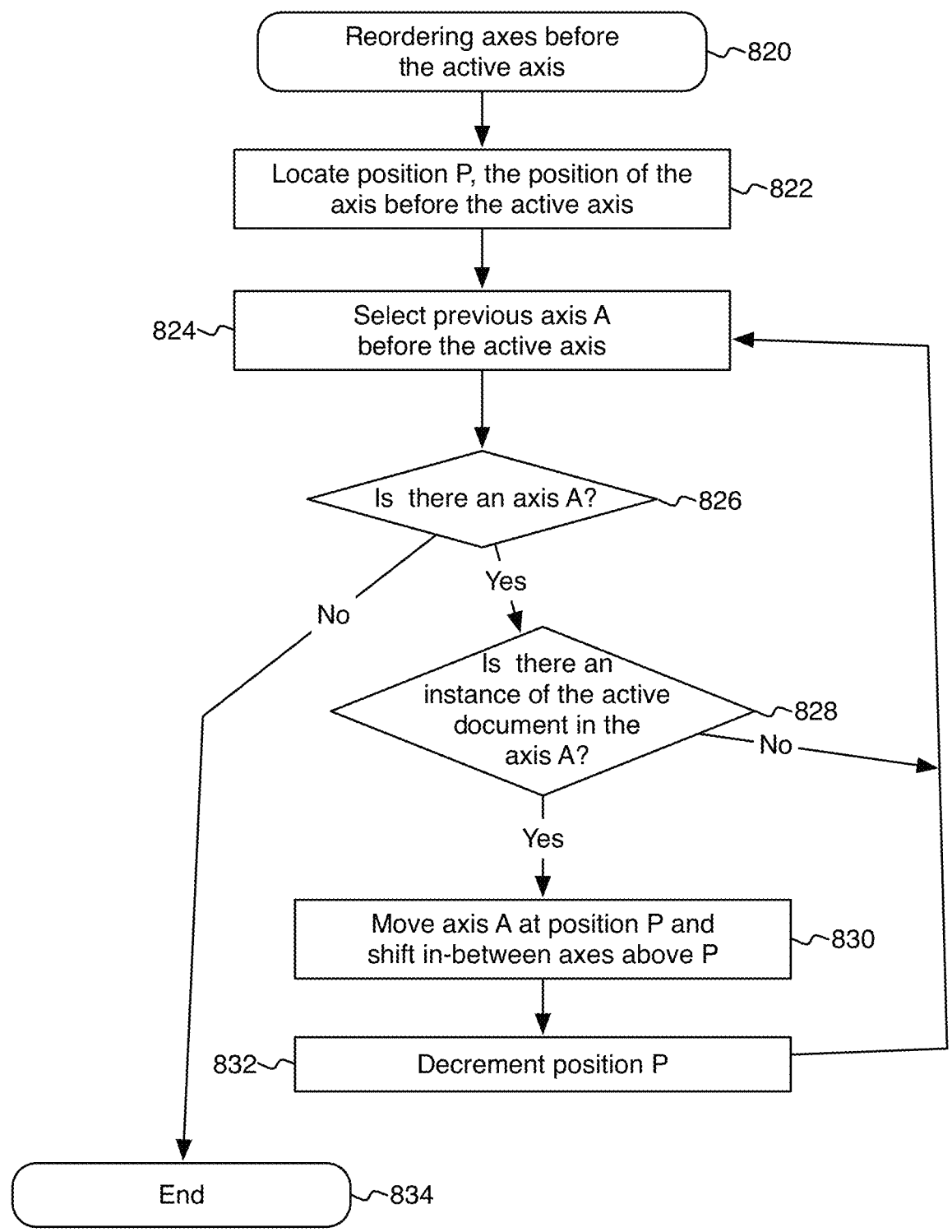
FIG. 14 is an exemplary flowchart describing the logic of the axes reordering function in accordance with an exemplary embodiment of the present invention.
Figure 15:
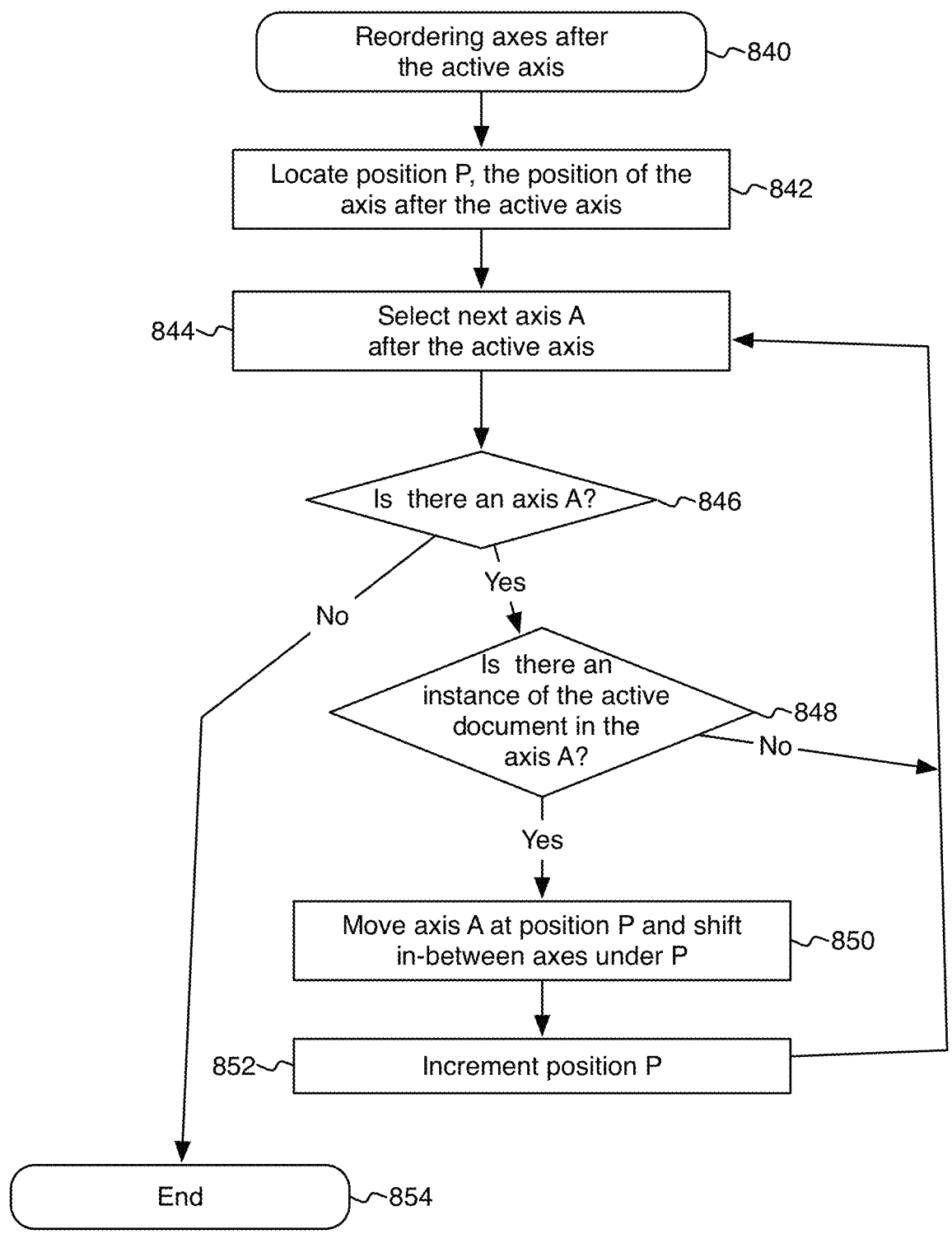
FIG. 15 is an exemplary flowchart describing the logic of the axes reordering function in accordance with an exemplary embodiment of the present invention.

FIG. 14 and FIG. 15 are similar flowcharts demonstrating the logic of the axes reordering function. The flowchart of FIG. 14 is used to reorder the axes 292 above the active axis 338 and the flowchart of FIG. 15 is used to reorder the axes under the active axis 338. When using the axes reordering function, the two flowcharts may be used.

The flowchart of FIG. 14 will be using variables A and P. A variable is a symbolic name referring to a value which may change during the processing of the flowchart. The variable A will get the values of different axes 292 present before the active axis 338. The variable P is referring to the position of an axis 292. Variable P can be an integer, or a memory pointer (a stored memory address) that indicates the position an axis 292. The flowchart starts at step 820. The step 822 is to locate the previous axis 292, and stock its position in variable P. Step 824 starts a loop over all the axes 292 above the active axis 338 and store them in variable A. For example, if the active axis 338 is displayed in fourth position from the top, the iteration of axes 292 in variable A could be done in this order: third axis 292.3, second axis 292.2 and first axis 292.1. If no previous axis 292 is found, the variable A is set to a null value, and step 826 tests either if variable A is null and stops the reordering function if so with step 834. Step 828 tests if there is an instance of the active document 337 in the axis 292 of variable A. If not, the test is done on the next axis 292 by returning to step 824. In a case where an instance of the active document 337 is found in axis 292 of the variable A, step 830 moves the axis 292 of the variable A to the next position of variable P and shifts other axes 292 above. For example, if the fourth axis 292 is the active axis 338 and the second axis 292 has an instance of the active document 337 and the variable P was the position of the third axis 292, then the second axis 292.2 would be moved at the third position. And the previously third axis would be shifted at the second position. Finally, step 832 decrements the variable P. If the variable P has the third axis 292 position value, decrementing would have the effect to set the variable P to the second axis 292 position. And the next axis 292 is selected at step 824, continuing the loop until each axis 292 above the active axis 338 was checked or reordered.

The flowchart of FIG. 15 will be using variables A and P. A variable is a symbolic name referring to a value which may change during the processing illustrated in the flowchart. Variable A will get the values of different axes 292 present before the active axis 338. The variable P is referring to the position of an axis 292. Variable P can be an integer, or a memory pointer (a stored memory address) that indicates the position an axis 292. The flowchart starts at step 840. The step 842 is to locate the previous axis 292, and stock its position in variable P. Step 844 starts a loop over all the axes 292 below the active axis 338 and store them in variable A. For instance, if the active axis 338 is in the third position, the iteration of axes 292 in variable A could be done in this order: fourth axis 292, fifth axis 292, sixth axis 292, and so on. If no next axis 292 is found, the variable A is set to a null value, and step 846 tests either if variable A is null and stops the reordering function if so with step 854. Step 848 tests if there is an instance of the active document 337 in the axis 292 of the variable A. If not, the test is done on the next axis 292 by returning to step 844. In the case where an instance of the active document 337 is found in axis 292 of the variable A, step 850 moves the axis 292 of the variable A to the next position of variable P and shift other axes 292 below. For example, if the third axis 292 is the active axis 338 and the fifth axis 292 has an instance of the active document 337 and the variable P was the position of the fourth axis 292, then the fifth axis 292 would be moved at the fourth position. And the previously fourth axis would be shifted at the fifth position. Finally, step 852 increments the variable P. If the variable P has the third axis 292 position value, decrementing would have the effect to set the variable P to the fourth axis 292 position. And the next axis 292 is selected at step 844, continuing the loop until each axis 292 below the active axis 338 was checked or reordered.

Figure 16:
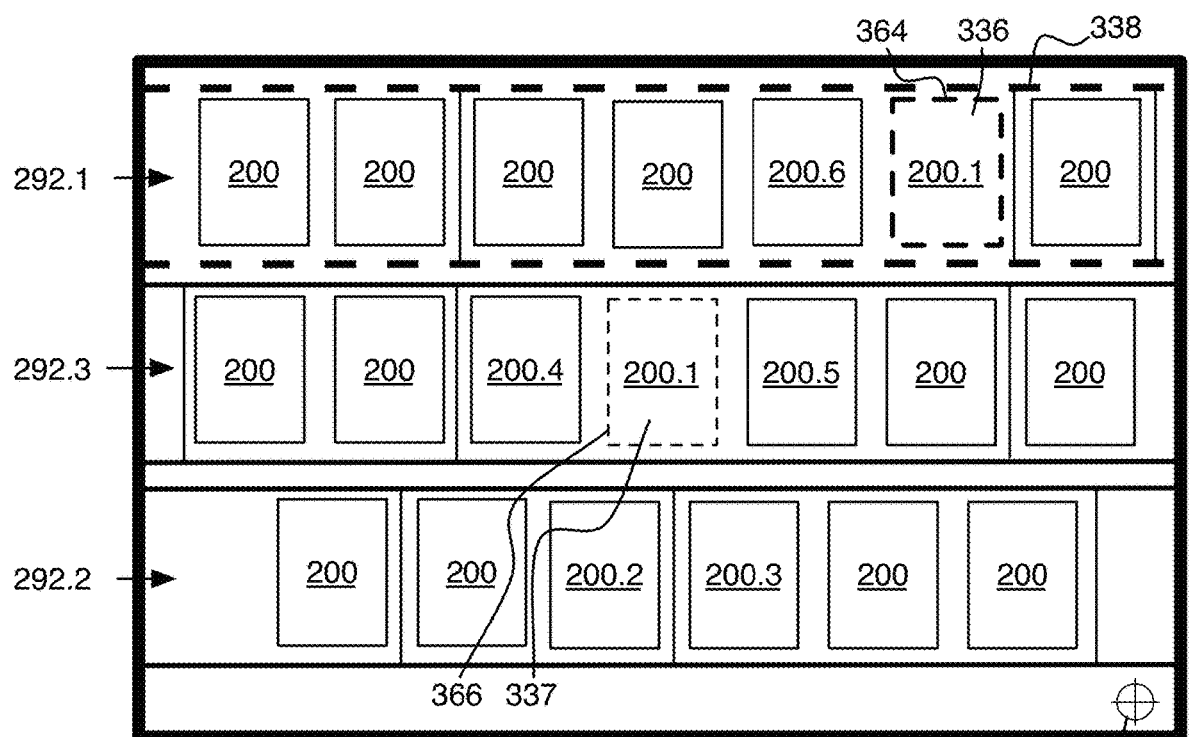
FIG. 16 is a schematic illustration of a display area comprising multiple axes of documents disposed in a longitudinal and parallel arrangement with an active document, another aligned instance of the active document and an aligned axis in accordance with an exemplary embodiment of the present invention.
Figure 17:
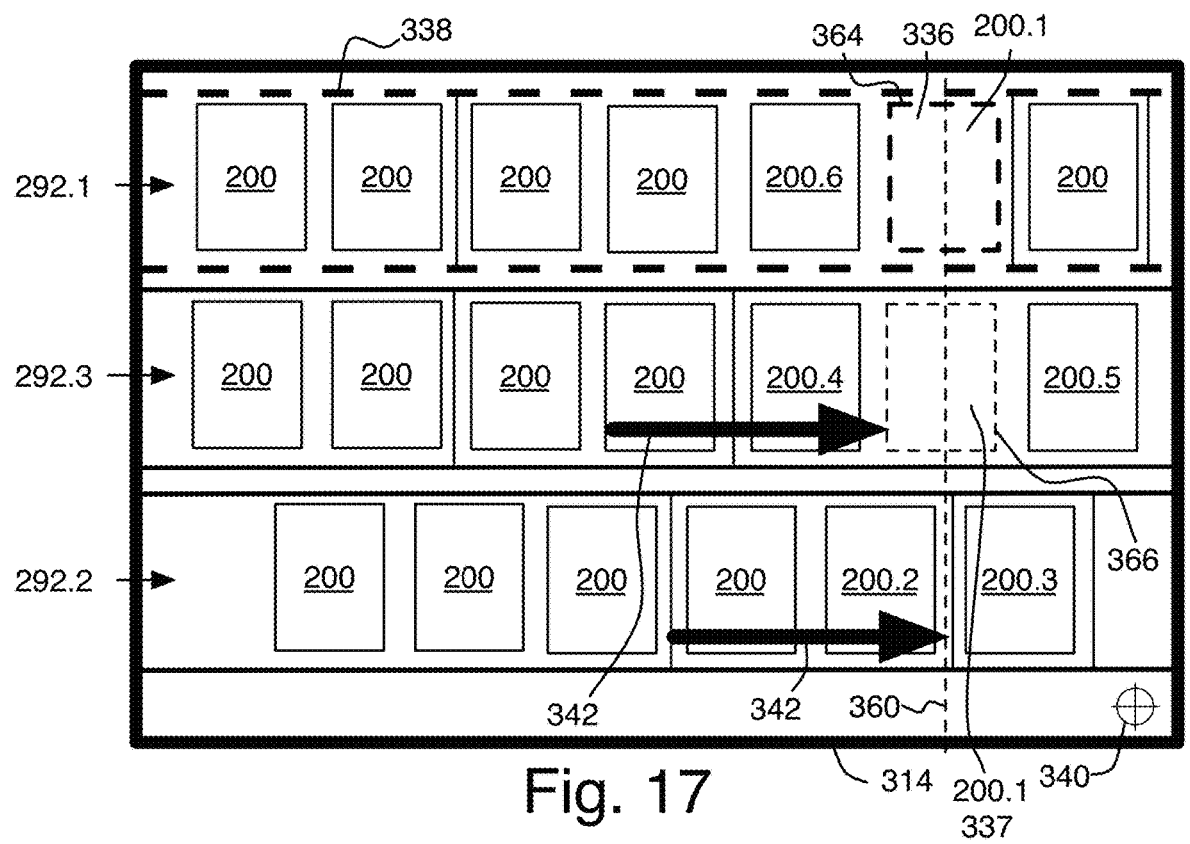
FIG. 17 is a schematic illustration of a display area comprising multiple axes of documents disposed in a longitudinal and parallel arrangement with an active document, another aligned instance and an aligned axis in accordance with an exemplary embodiment of the present invention.

FIGS. 16 and 17 show an alternate embodiment where the centering function is enabled with an activation of the aligning tool 340 without prior enablement of the axes aligning function. In FIG. 16, the active document 336, 200.1 is shown in the axis 292.1 slightly before the right edge of the display area 314. FIG. 17 illustrates the effect of the click on the aligning tool 340 with only the alignment function enabled. One can appreciate how axes gets scrolled through scrolling aligned relatively to the active document horizontal location, instead of at the center of the display area 314. The perpendicular alignment line 360 is now showing at the right side of the display area 314. In this alternate embodiment, a second click of the aligning tool 340 may trigger the centering function on every axes 292.

Figure 18:
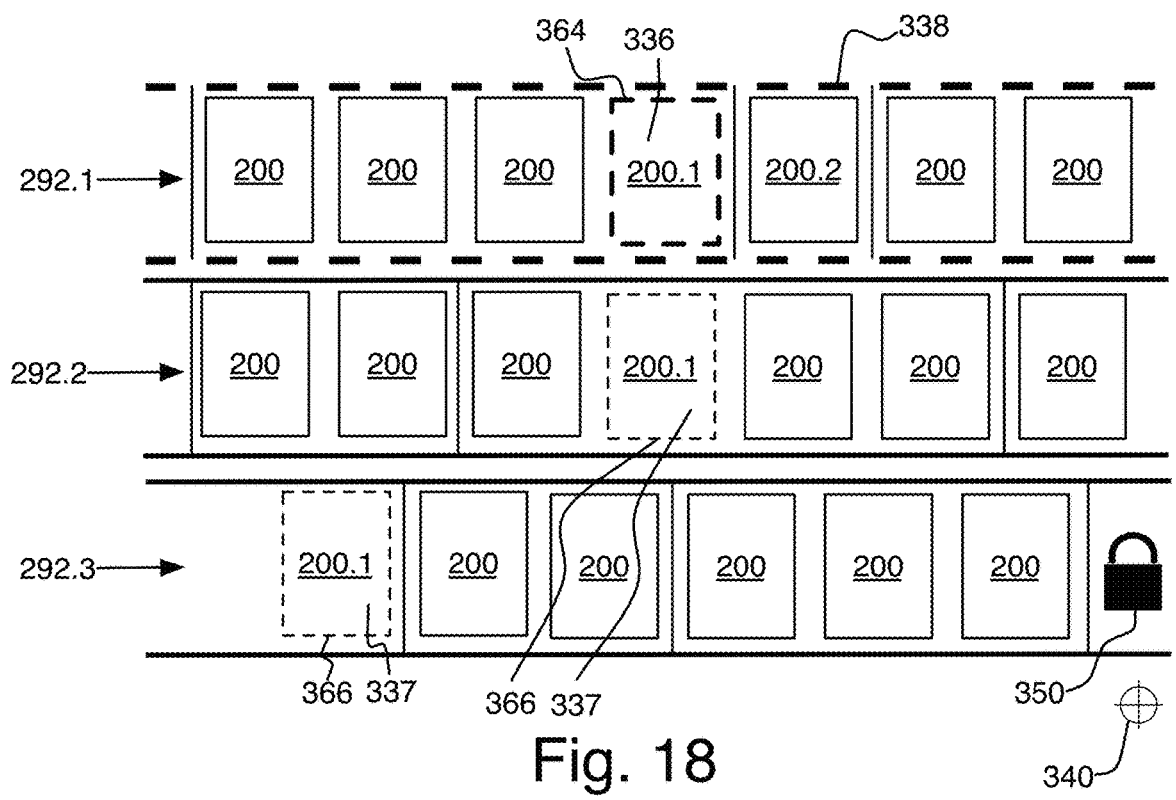
FIG. 18 is a schematic illustration of multiple axes of documents disposed in a longitudinal and parallel arrangement with an active document and another aligned instance of the active document in accordance with an exemplary embodiment of the present invention.

From FIG. 18, the next figures omit illustrating the display area 314 for more clarity, but it should be considered that the interactive axes 292 and their documents 200 are displayed typically on a display area 314 or other alternative display limits set within the display area 314.

Moving now to FIG. 18 showing an embodiment providing a functionality adapted to lock an axis 292 so it won't be affected by the alignment function. Axis 292.3 has an axis movement lock tool 350. This can be set by the system under certain conditions or by the user through, for instance, a menu selection, a keyboard shortcut, a mouse, a gesture, etc. When an active axis 338 is locked, it can respond to the centering function. But, when a non-active axis 292 is locked, the alignment function won't affect the position of the axis 292. For example, in FIG. 18, the document 200.1 of axis 292.1 is the active document 336, and the second instance of the active document 337 in the axis 292.2 is already aligned with the active document 336. This may be a consequence of the use of the alignment function. The third instance of the active document 337 on the axis 292.3 is not aligned with the others axes 292. Since the axis 292.3 is considered locked, triggering the alignment function by activating the aligning tool 340 would not initiate any scrolling axis movement 342 (not shown in FIG. 18) on the locked axis 292.3.

Figure 19:
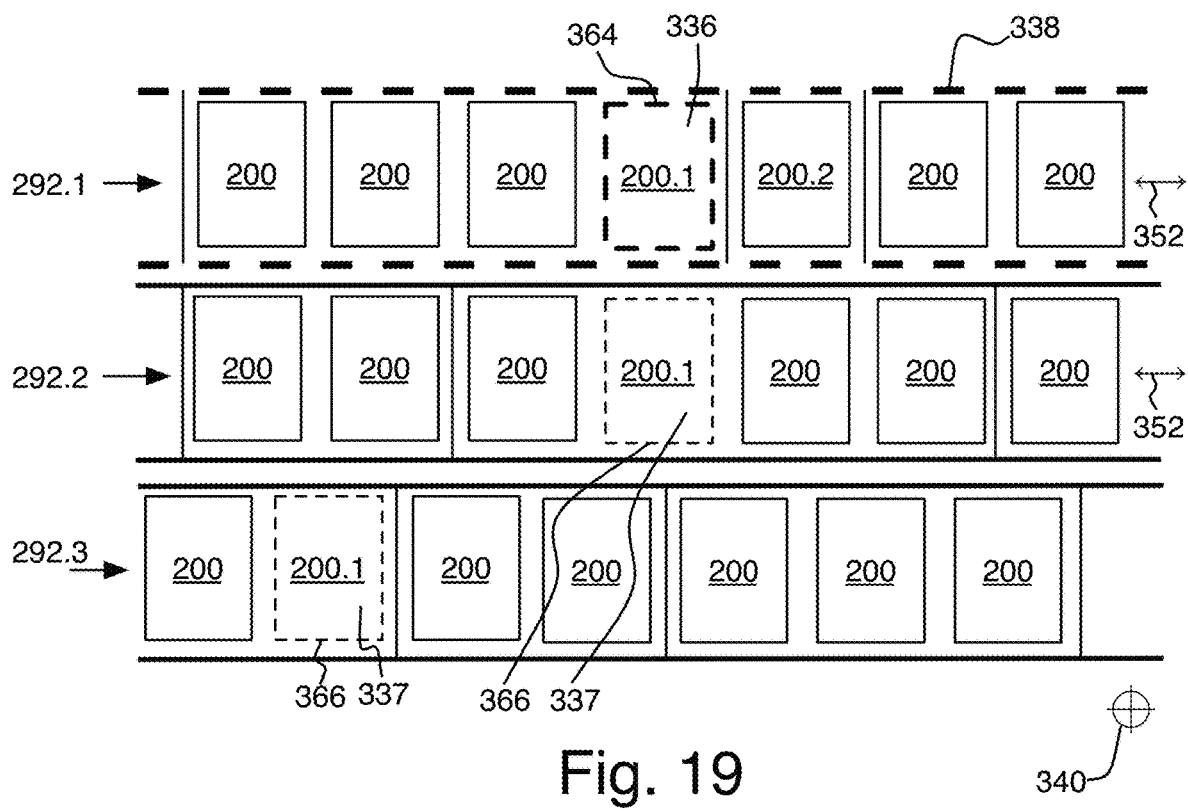
FIG. 19 is a schematic illustration of multiple axes of documents disposed in a longitudinal and parallel arrangement with an active document and another aligned instance of the active document in accordance with an exemplary embodiment of the present invention.

Another similar functionality is shown in FIG. 19. The axes 292.1 and 292.2 have axes movement (displacement) link icons 352 thereon to allow an auto-alignment function. This can be set by the system under certain conditions, or by the user through a menu, keyboard shortcut, a mouse, a gesture, etc. When two or more axes 292 have the movement (displacement) link icon 352, their scrolling are automatically synchronized.

Figure 20:
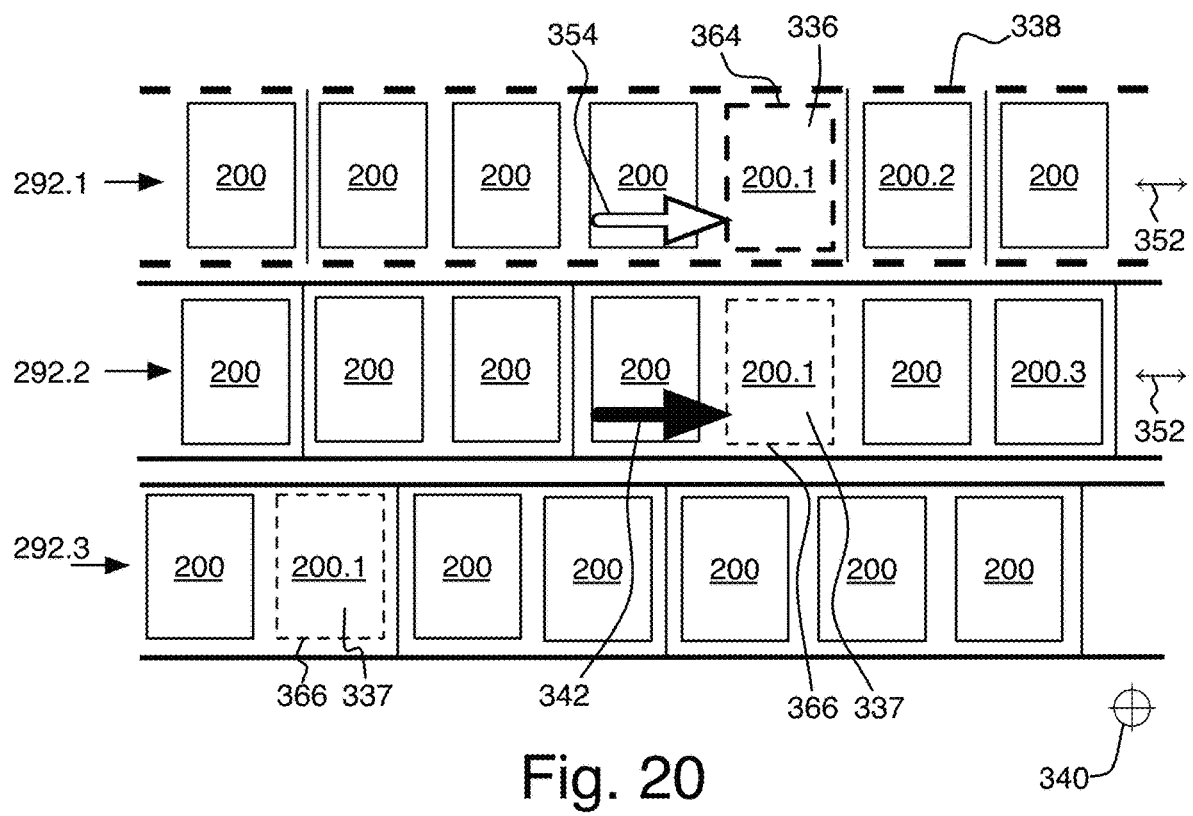
FIG. 20 is a schematic illustration of multiple axes of documents disposed in a longitudinal and parallel arrangement with an active document and another aligned instance of the active document in accordance with an exemplary embodiment of the present invention.

FIG. 20 shows the result of a user scrolling axis movement 354 on the axis 292.1 where the axis 292.2 may automatically scrolls through an equivalent scrolling axis movement identified by arrow 342 so the two instances of the active documents 337, 200.1 in axes 292.1 and 292.2 are kept aligned. One can appreciate that the axis 292.3 remains unchanged since there is no movement link icon 352 on axis 292.3. The third axis 292.3 could be aligned with the others axes 292.1 and 292.2 through the activation of the aligning tool 340.

Figure 21:
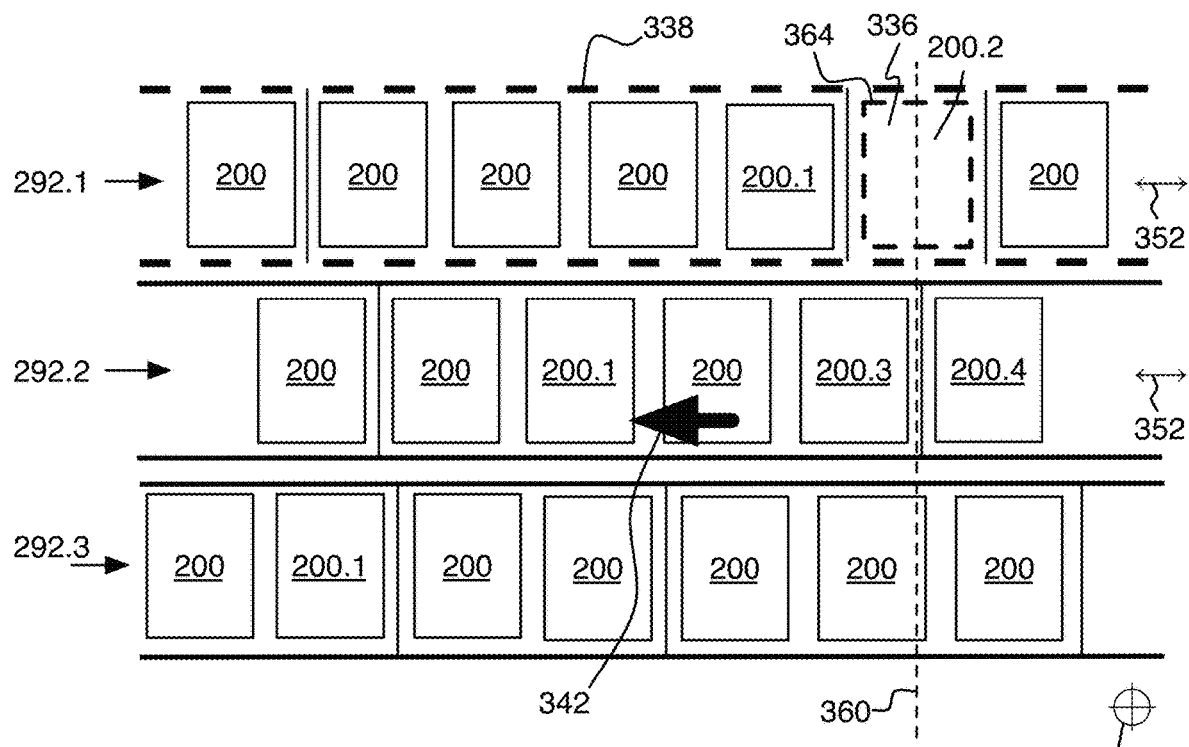
FIG. 21 is a schematic illustration of multiple axes of documents disposed in a longitudinal and parallel arrangement with an active document and another aligned instance of the active document in accordance with an exemplary embodiment of the present invention.

FIG. 21 shows the result of an activation of document 200.2. It means, in FIG. 21, that document 200.2 is now considered to be the active document 336. This happened while axes 292.1 and 292.2 were still linked with the auto-alignment function. One can appreciate how the documents 200.1 are now unaligned. The axis 292.2 was automatically scrolled through a scrolling axis movement 342 to align the location between documents 200.3 and 200.4 at the middle of the longitudinal location of active document 200.2. This happens because an instance of the active document 337, 200.2 is absent from axis 292.2 and, as an effect of the auto-alignment function, the axes 192 aligned location shows a portion of the axis chronological order where active document 336, 200.2 is found, between the time of documents 200.3 and of document 200.4. A perpendicular alignment line 360 can be shown to indicate that an alignment of axes 292 has been automatically performed. One can appreciate that the axis 292.3 remains unchanged since there is no movement link icon 352 on axis 292.3. The third axis 292.3 could be aligned through the activation of the aligning tool 340. The third axis 292.3 could be aligned with the others axes 292.1 and 292.2 through the click on the aligning tool 340.

Figure 22:
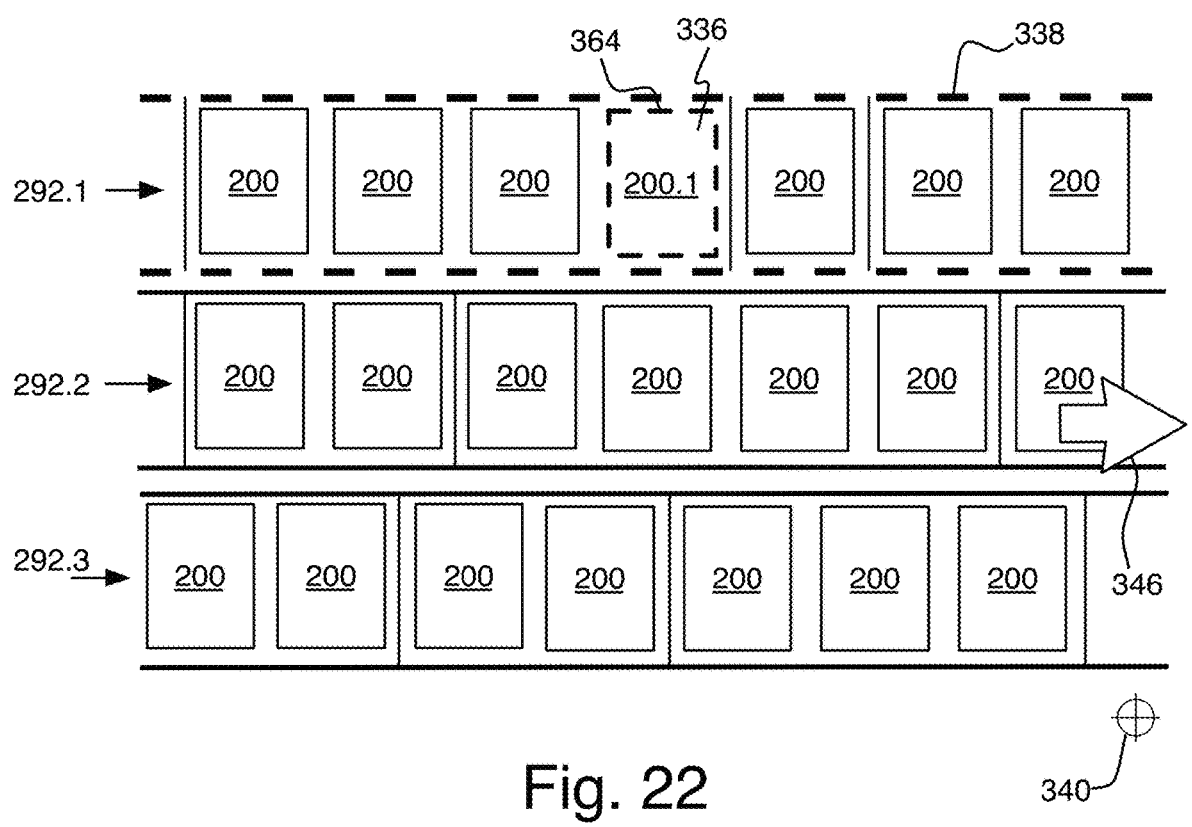
FIG. 22 is a schematic illustration of multiple axes of documents disposed in a longitudinal and parallel arrangement with an active document and another instance of the active document being identified outside of a display area in accordance with an exemplary embodiment of the present invention.

FIG. 22 shows another embodiment when an instance of the active document 337, 200.1 is not visible in the display area 314 (not shown in FIG. 22, but the edges of the figure may be considered as the limits of the viewport of the display area 314). A user-selectable tool, illustratively an arrow tool 346 is shown next to associated axis 292.2, identifying the direction of the axis 292.2 to displace another instance of the active document 200.1. The arrow tool 346 is reacting to activation provided by a pointing device 142 (not shown in Figure) but could also react to other means like keyboard shortcuts or body gestures. When activated, this triggers the aligning function on the axis 292.2 to which the user-clickable arrow 346 is associated, to longitudinally align (horizontally) the other instances of the active document 337, 200.1 on the axis 292.2 with the active document 336, 200.1 of the axis 292.1 through a longitudinal axis scrolling movement 342 (not shown in Figure). Alternatively, the user could still use the aligning tool 340 to center and/or align active documents 336, 200.1 and axes 292 automatically. Once the active document 336, 200.1 of axis 292.2 is visible in the display area 314, the user-clickable arrow 346 may disappear.

Figure 23:
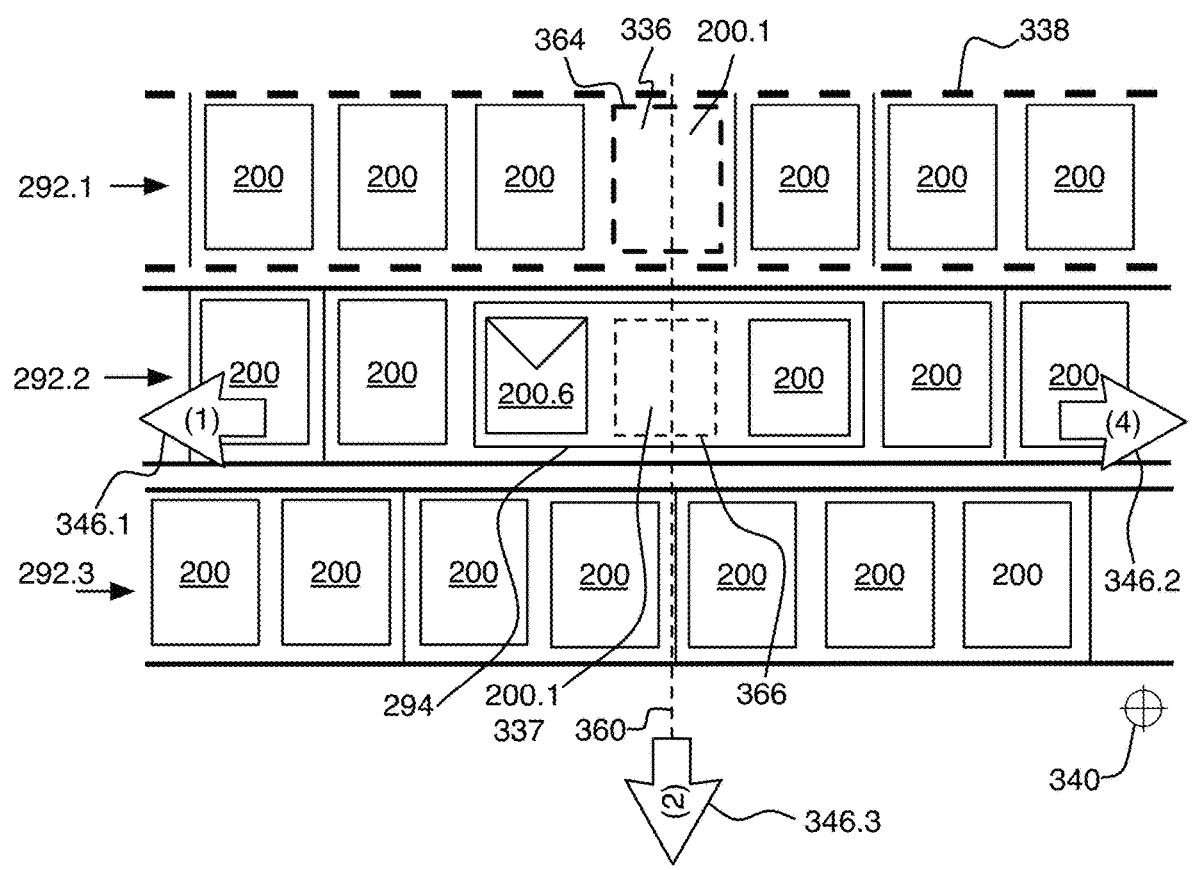
FIG. 23 is a schematic illustration of multiple axes of documents disposed in a longitudinal and parallel arrangement with an active document, another aligned instance of the active document and other instances of the active document being identified outside of the display area in accordance with an exemplary embodiment of the present invention.

FIG. 23 shows another example of different uses of arrow tools 346. In this example, the active document 336 is shown in the axis 292.1, and another instance of the active document 337 is aligned and shown in the axis 292.2. Axis 292.2 may include multiple instances of the active document 337 on the same axis 292.2, and thus multiple arrow tools 346.1 and 346.2 indicate to the user directions of other documents. In this example, there is one instance of the active document 337 before the visible portion of axis 292.2 and four instances of the active document 337 after the visible portion of the axis 292.2. The respective number of instances may be written on the arrow tools 346.1 and 346.2. No arrow tool 346 is shown over axis 292.3. This indicates, in the illustrative embodiment, that no instance of the active document 337 is comprised in axis 292.3. Triggering the event the arrow tool 346.2 scrolls the axis 292.2 to the next instance of the active document 337. Doing so, the axis 292.2 could show arrow tools 346 indicating that there are two instances of the active document 337 at left and three instances of the active document 337 at the right of the view port of the display area 314. Note that the tool 346 is illustratively using an arrow shape and other means, shape or form can be used without departing from the scope of the present application.

Still in FIG. 23, a third arrow tool 346.3 is visible at the bottom of the display area 314 (not shown in Figure, but the edges of the figure may be considered as the limits of the viewport of the display area 314) and this one is directed to the bottom of the display area 314. This indicates that two instances of the active document 337 may be found in some axes 292 below 292.3 which are not visible in the display area 314. Clicking on this may scroll vertically to a vertical location where the first axis 292 with an instance of the active document 337 is shown in the display area 314.

Figure 24:
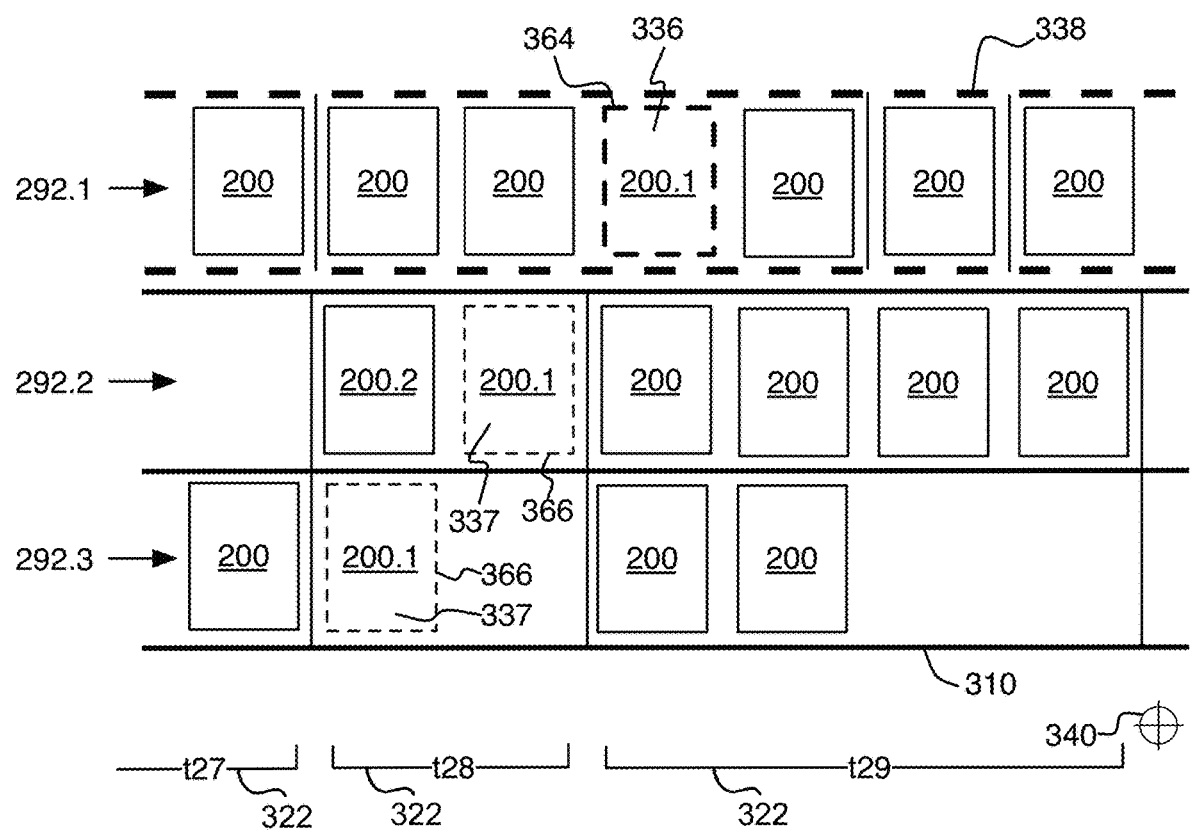
FIG. 24 is a schematic illustration of an axis of documents and a group of axes of documents disposed in a longitudinal and parallel arrangement with an active document and other instances of the active document in accordance with an exemplary embodiment of the present invention.

FIG. 24 shows an axis 292.1 and a group 310 of axes 292.2 and 292.3. When two or more axes 292 are merged into a group 310, they share a same timeline. In the illustrated example, all axes 292 have one visible instance of the active document 337. The instances of the active document 337 in group 310 are showing in the same time unit t28, it could mean they are considered the same day. In axis 292.2, there is a document 200.2 that is considered inserted before document 200.1. In this embodiment, the instance of the active document 337 of axis 292.3 is aligned at left because the groups 310 may be more compact if all documents in time units 322 are appearing sequentially from left to right.

Figure 25:
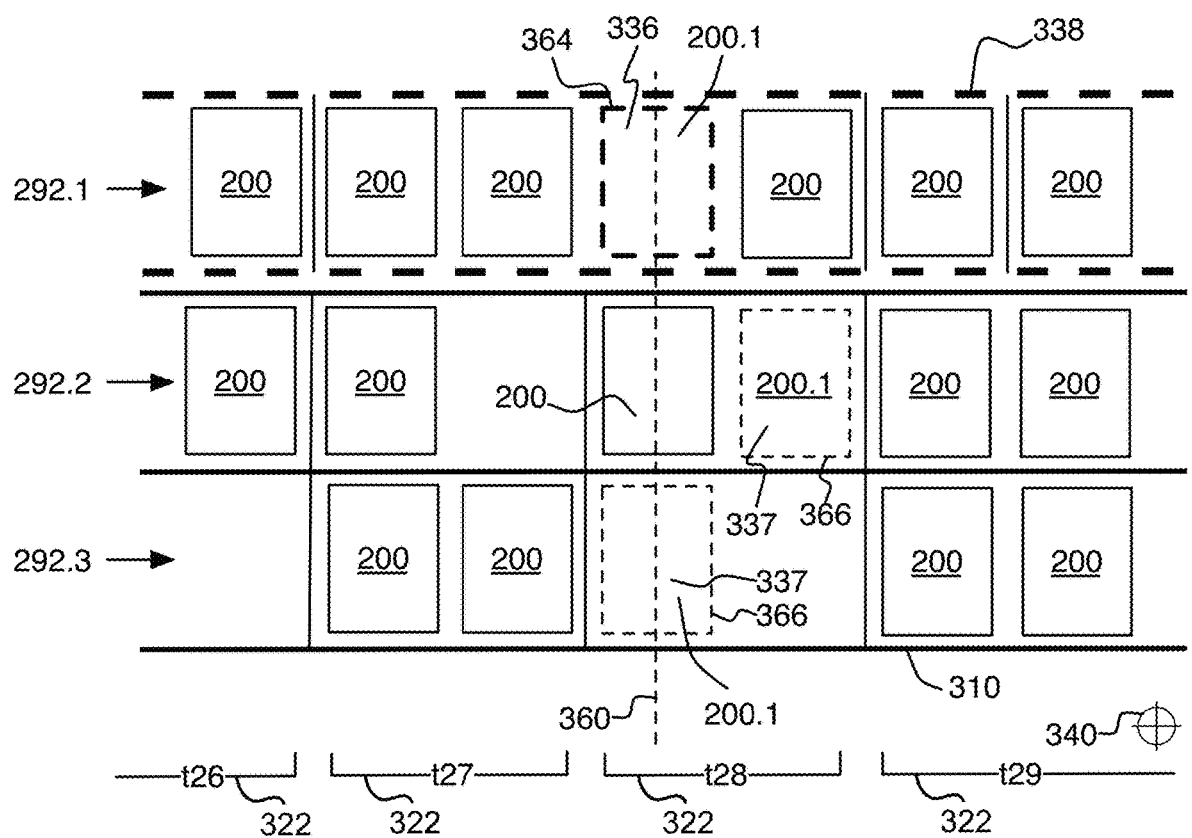
FIG. 25 is a schematic illustration of an axis of documents and a group of axes of documents disposed in a longitudinal and parallel arrangement with an active document and other instances of the active document with one instance being aligned in accordance with an exemplary embodiment of the present invention.

Moving to FIG. 25, it shows the effect of the aligning tool 340 where the instance of the active document 337 of the axis 292.3 is aligned with the active document 336. An alignment with the second instance of the active document 337 on axis 292.2 could have also been possible. In this embodiment, the first horizontal instance of the active document 200.1 is chosen. Subsequent triggering of the alignment function of the aligning tool 340 iterates between different aligned position of the group 310.

Figure 26:
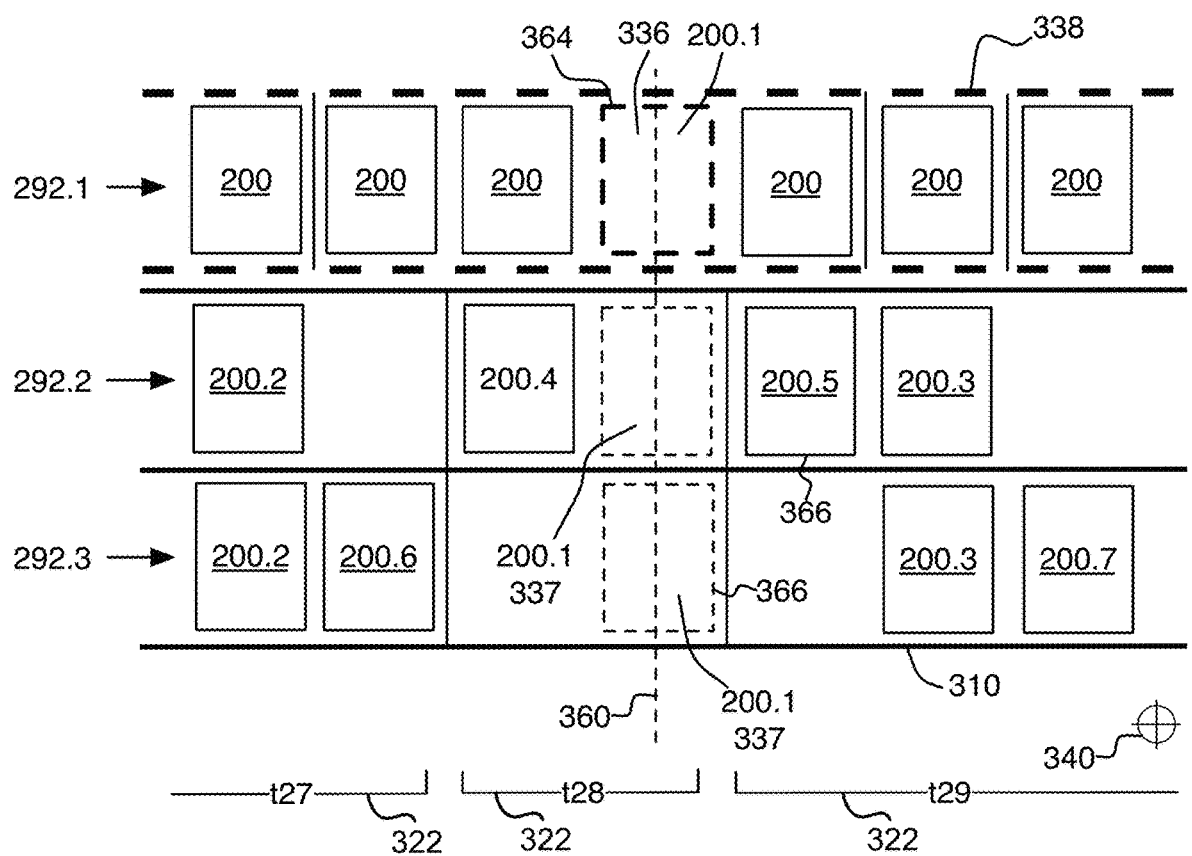
FIG. 26 is a schematic illustration of an axis of documents and a group of axes of documents disposed in a longitudinal and parallel arrangement with an active document and other instances of the active document being aligned in accordance with an exemplary embodiment of the present invention.

FIG. 26 illustrates an alternate embodiment where the groups 310 align horizontally the same instances of documents 200 in their time units 322. For example, documents 200.1, 200.2 and 200.3 are longitudinally aligned in their time units because they are instances of the same documents 200. Documents 200.4 and 200.5 are not aligned with other instances of the same documents 200 because they are only visible on axis 292.2. This is also the case for documents 200.6 and 200.7 which are only visible on axis 292.3. This provides visualization advantages for a viewer. One can appreciate, for instance. how empty document spaces in group 310 are providing additional information about the timely ordering of documents 200 to display which document 200 is timed before or after another in a time unit t. It also helps solving the active document 200.1 alignment issue when triggering the alignment function.

Figure 27:
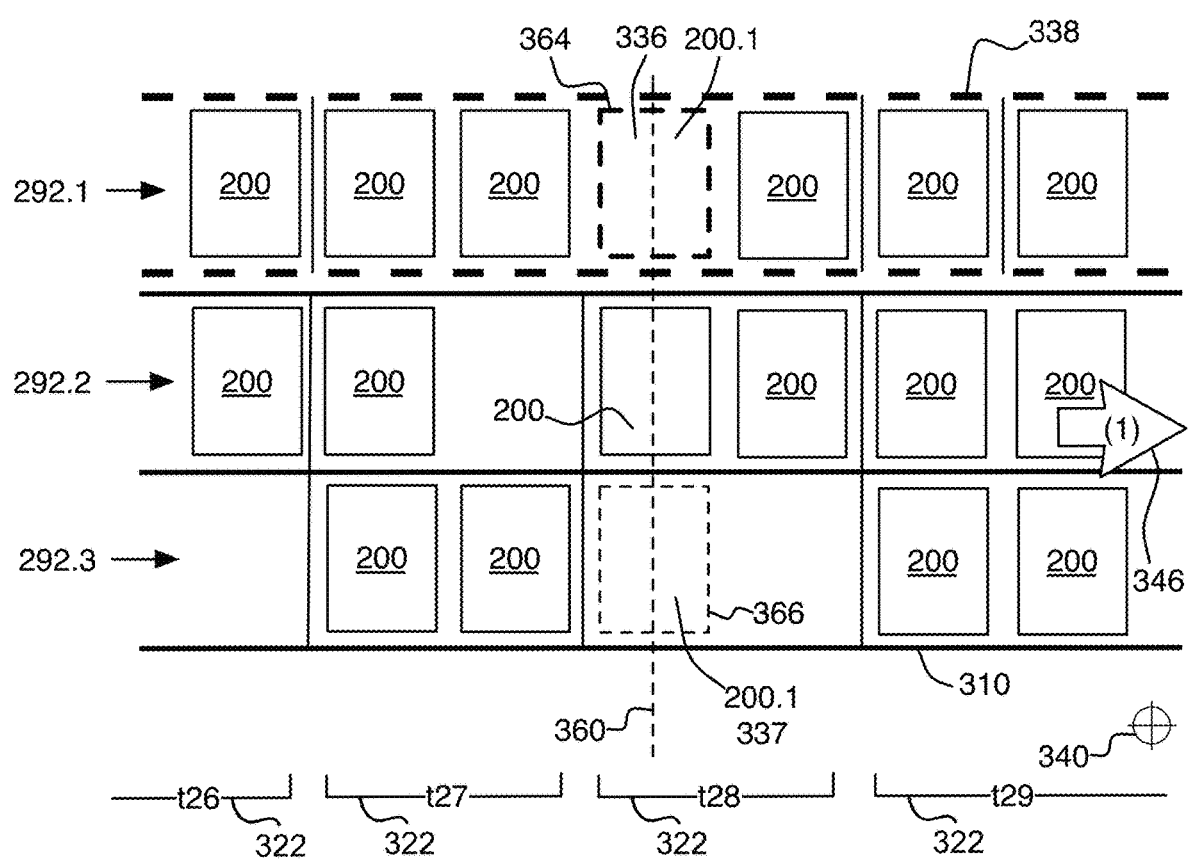
FIG. 27 is a schematic illustration of an axis of documents and a group of axes of documents disposed in a longitudinal and parallel arrangement with an active document, another instance being aligned and another instance being identified outside of the display area in accordance with an exemplary embodiment of the present invention.

FIG. 27 shows another situation where an instance of the active document 337 is shown on the axis 292.2 outside of the display area 314 (not shown in FIG. 27, but the edges of the figure may be considered as the limits of the viewport of the display area 314). Even the groups 310 of axes 292.2 and 292.3 may be sharing a same timeline, the different instances of a same document 200 may be in different time units 322. This may happen, for example, if the other instance of the active document 337 is shown in a subsidiary array linked on another document 200 with a different date. It may also happen if the axes 292.2 and 292.3 use different time sorting attributes as collation function 300 (not shown in FIG. 27). For instance, the documents 200 on axis 292.2 could be sorted by insertion date while the axis 292.3 could be sorted by last modification date. The arrow tool 346 indicates the presence of the other instance of the active document 337 on the axis 292.2 outside of the display area 314 (not shown in Figure, but the edges of the figure may be considered as the limits of the viewport of the display area 314).

Figure 28:
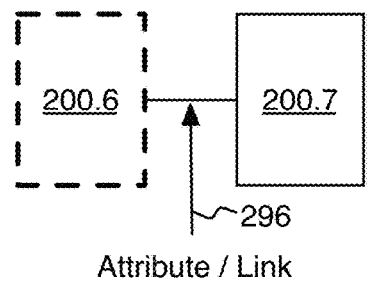
FIG. 28 is a schematic illustration of two documents being linked in accordance with an exemplary embodiment of the present invention.

FIG. 28 illustrates how two documents may have a link between them. This link may be expressed through an attribute. The document 200.6 can be linked to another document 200.7 through an attribute or a relation therebetween. An attribute 296 (not shown in FIG. 28) can have several types, like, for instance, a Boolean value, a string value, a unique document identifier or an address to another document. Two documents 200 may be considered as linked if at least one attribute associated with one of the two documents 200 has a value linked to the other document 200. For example, document 200.6 may be a published patent document being linked to a document 200.7 which is a patent application art document. The document 200.6 may have a "Patent Application" attribute 296 (not shown in FIG. 28) which value is a unique identifier of document 200.7.

Figure 29:
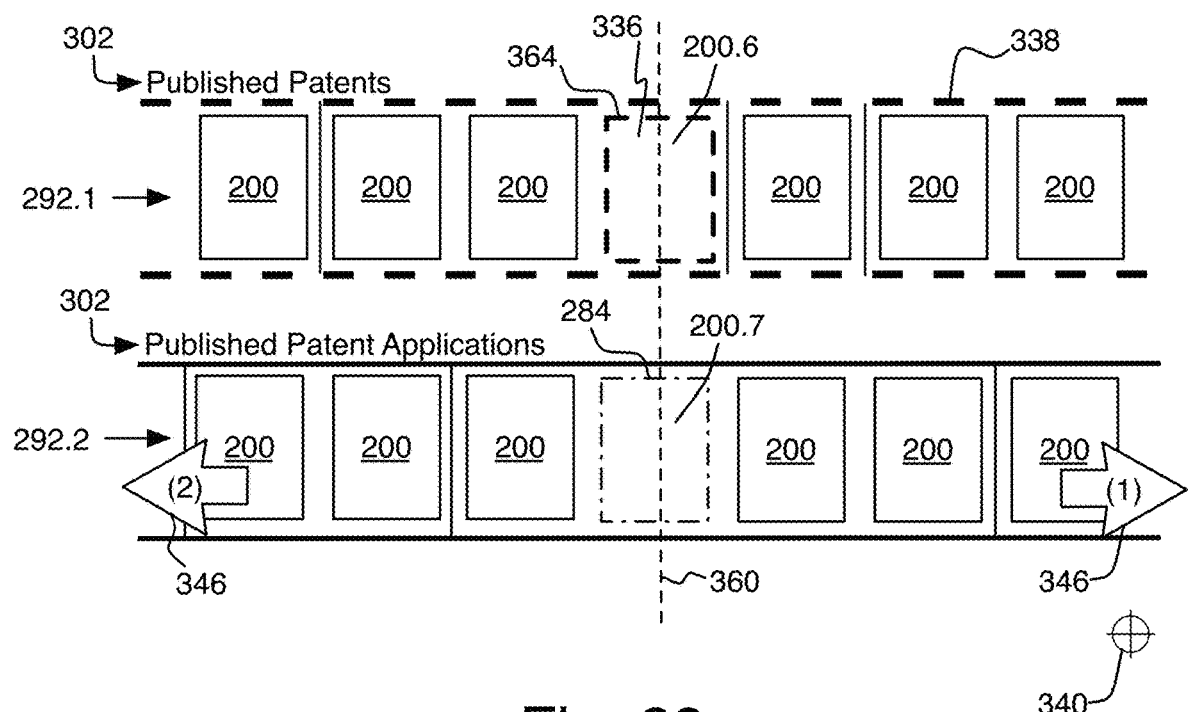
FIG. 29 is a schematic illustration of multiple axes of documents disposed in a longitudinal and parallel arrangement with an active document and a related document being aligned in accordance with an exemplary embodiment of the present invention.

FIG. 29 shows an alternate embodiment where two axes 292 of documents 200, where the documents 200 of the first axis 292 represent published patent arts and the documents 200 of the second axis 292 represent published patent application art documents, as described in their axis header title 302. The axes 292 may be used by a user to explore patent art documents related to a prior art searching. In such a search, the patent application art documents of the published patent art documents may be found in the same search result. In the current example, the document 200.6 may be a published patent art document while document 200.7 may be a patent application art document. The published patent art document 200.6 was made active by an action of the user or a function of the system. The document 200.7 may have a special border, or visual distinctive feature 284, to let the user know it is a related document to the active published art document 200.6. In this embodiment, when using the aligning tool 340, the alignment function could align a related document 200.7 instead of instances of the active document 200.6. Also, the user may appreciate the two arrow tools 346 illustrating the presence of related documents to 200.6 and 200.7 in the axis. For example, it could be other publication of the patent application art with different kind codes, such as A1, A2 and A3.

Figure 30:
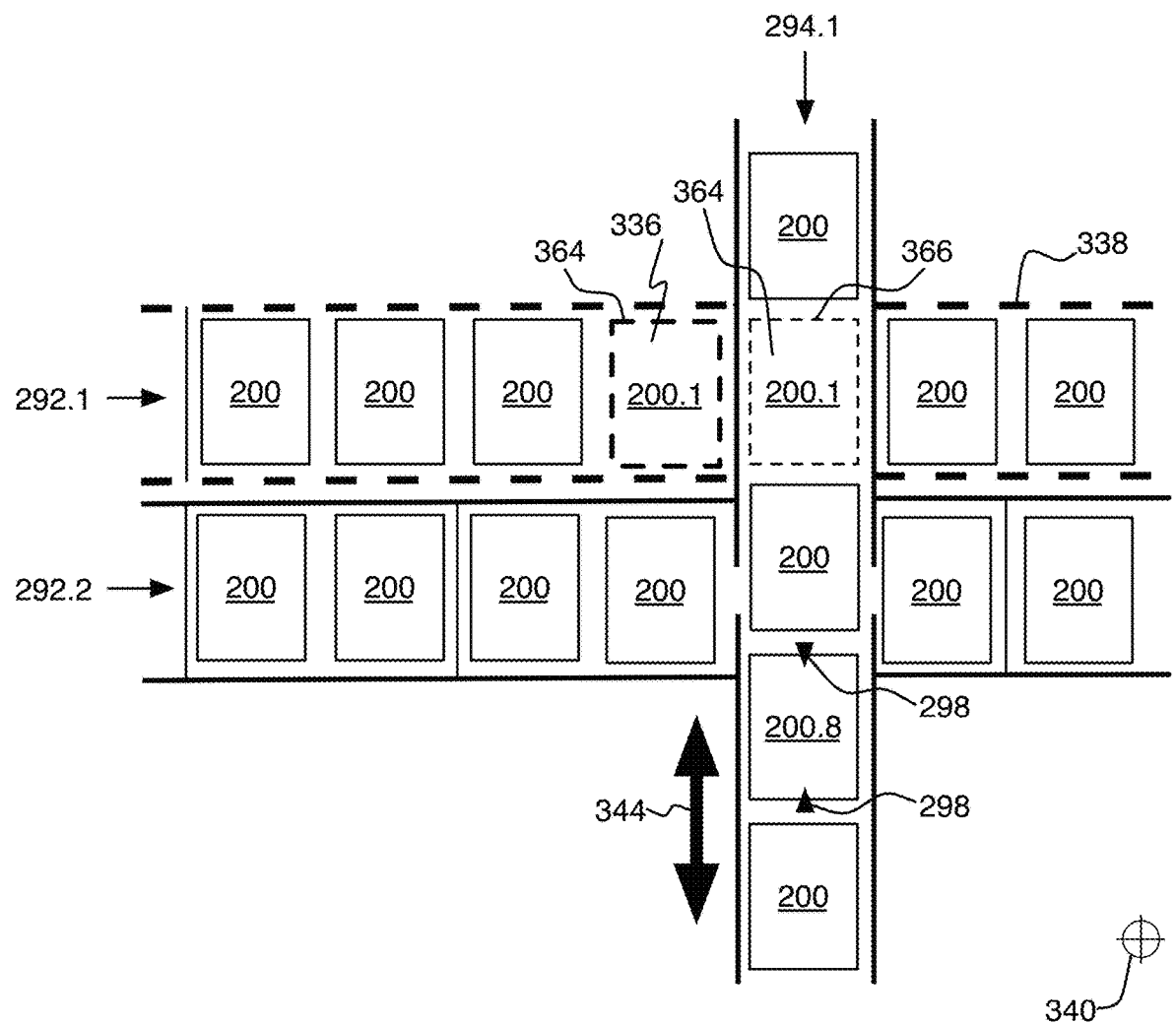
FIG. 30 is a schematic illustration of multiple axes of documents disposed in a longitudinal and parallel arrangement and a subsidiary axis of documents disposed orthogonal to the second longitudinal axis of documents with an active document and another instance being aligned in accordance with an exemplary embodiment of the present invention.

FIG. 30 describes another embodiment of the present invention when using the alignment function of the aligning tool 340 with instances of the active document 337 on a vertical subsidiary axis 294.1. Axis 292.2 is attached to a vertical subsidiary axis 294.1, through a pivot document 200.8. The pivot document 200.8 is a document that is both member on the axis 292.2 and its vertical subsidiary axis 294.1. The pivot document 200.8 represents the logical connector between the axis 292.2 and its subsidiary axis 294.1. This special status of document 200.8 is graphically discriminated by subsidiary axis connector visual distinctive features 298. This let the user knows which document is the logical connector between the axis 292.2 and its vertical subsidiary axis 294.1. In the same way that axes 292 on distinct axes groups 310 (not shown in Figure) can be moved independently one from another, the vertical subsidiary axis 294.1 can be moved vertically 344 from the other horizontal axes 292, thus implying the pertinence of having a subsidiary axis connector visual distinctive feature 298. When moving the axis 292.2 horizontally, the horizontal position of the vertical subsidiary axis 294.1 is also adjusted since they are connected.

When triggering the alignment function with the activation of the aligning tool 340, vertical subsidiary axes 294 may be affected by the alignment. In FIG. 30, the instance of the active document 337 of subsidiary axis 294.1 is horizontally contiguous to the active document 336, and is vertically aligned to the active document 336. These horizontal and vertical conditions may be the effect of the alignment function, the vertical position may have been adjusted programmatically through a vertical axis scrolling movement 342 (not shown in Figure) of the vertical subsidiary axis 294.1 and the horizontal position may have been adjusted through a horizontal axis scrolling movement 342 (not shown in Figure) of the horizontal axis 292.2 thus affecting the horizontal position of the vertical subsidiary axis 294.1. The horizontal position is adjusted to bring the instance of the active document 337 of the vertical subsidiary axis 294.1 contiguous to the active document 336, so the user may easily appreciate the other positioning of the other instance of the active document 337 without having an overlap of the two instances of the document 200.1.

The axis 292.2 which is the parent of its vertical subsidiary axis 294.1, it may also contain another instance of the active document 337. If so, its instance may be shown in priority, or an arrow tools 346 (not shown in Figure) may be shown to navigate between instances and vertical subsidiary axes 294 having an instance of the active document 337.

Figure 31:
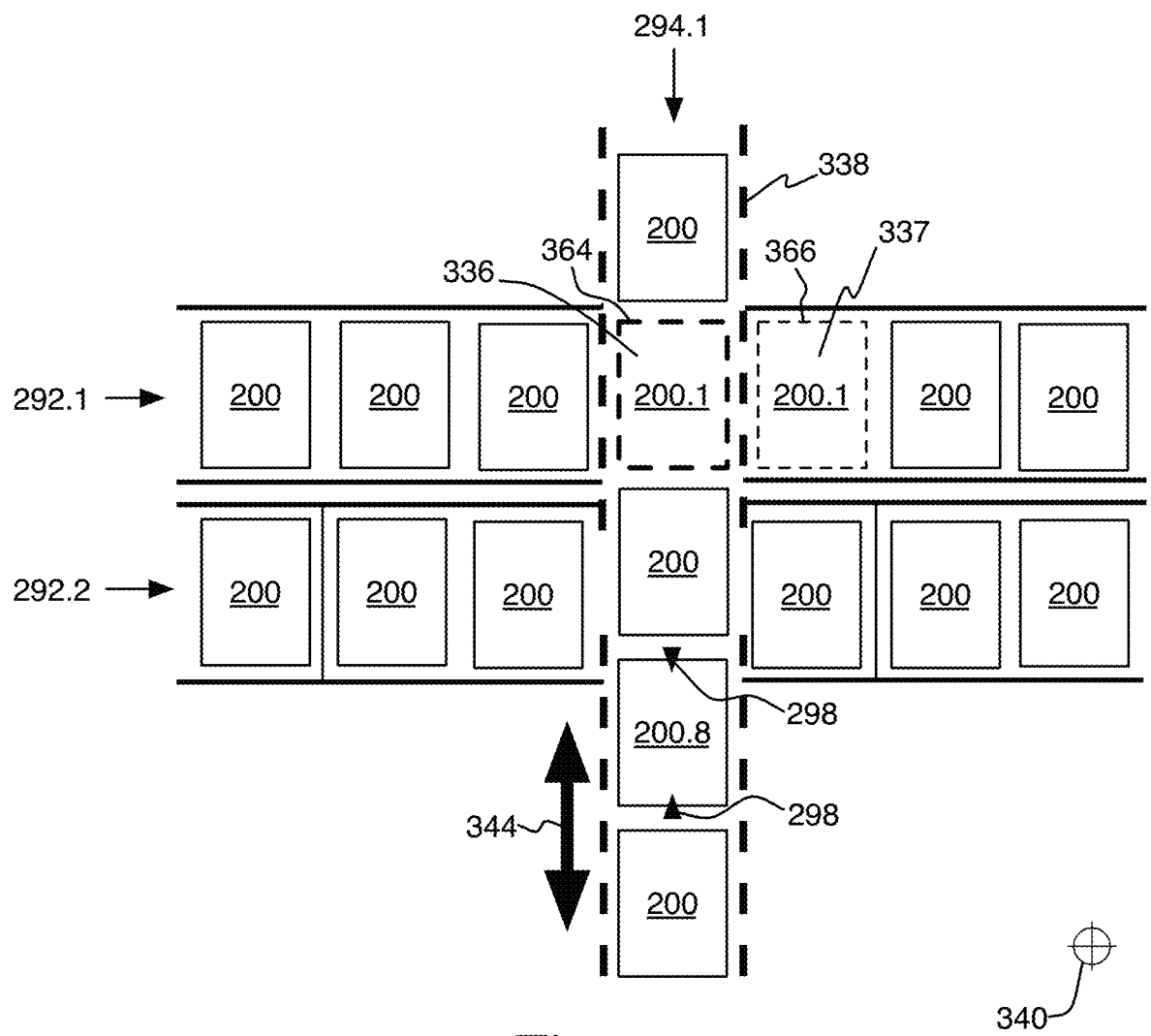
FIG. 31 is a schematic illustration of multiple axes of documents disposed in a longitudinal and parallel arrangement and a subsidiary axis of documents disposed orthogonal to the second longitudinal axis of documents with an active document and another instance being aligned in accordance with an exemplary embodiment of the present invention.

FIG. 31 describes another embodiment where the active document 336 is on a subsidiary vertical axis 294.1. The subsidiary vertical axis 294.1 parent is the horizontal axis 292.2. Using the alignment function of the aligning tool 340, the position of the instance of the active document 337 of axis 292.1 is made horizontally contiguous to the active document 336 and is vertically aligned to the active document 337 of the vertical subsidiary axis 294.1. These horizontal and vertical conditions may be the effect of the alignment function, the vertical position of the subsidiary axis 294.1 may have been adjusted through a vertical axis scrolling movement 342 (not shown in Figure) of the vertical subsidiary axis 294.1 in order to be align vertically the two instances of the document 200.1. And the horizontal position of the instance of the active document 337 of the horizontal axis 292.1 may be the effect of a horizontal axis scrolling movement 342 (not shown in Figure) of the horizontal axis 292.1. The horizontal position of the instance of the active document 337 of the axis 292.1 is adjusted to be contiguous to the instance of the active document 336. This let the user know which other instance of the active document 337 without having an overlap with the active document 336.

Figure 32:
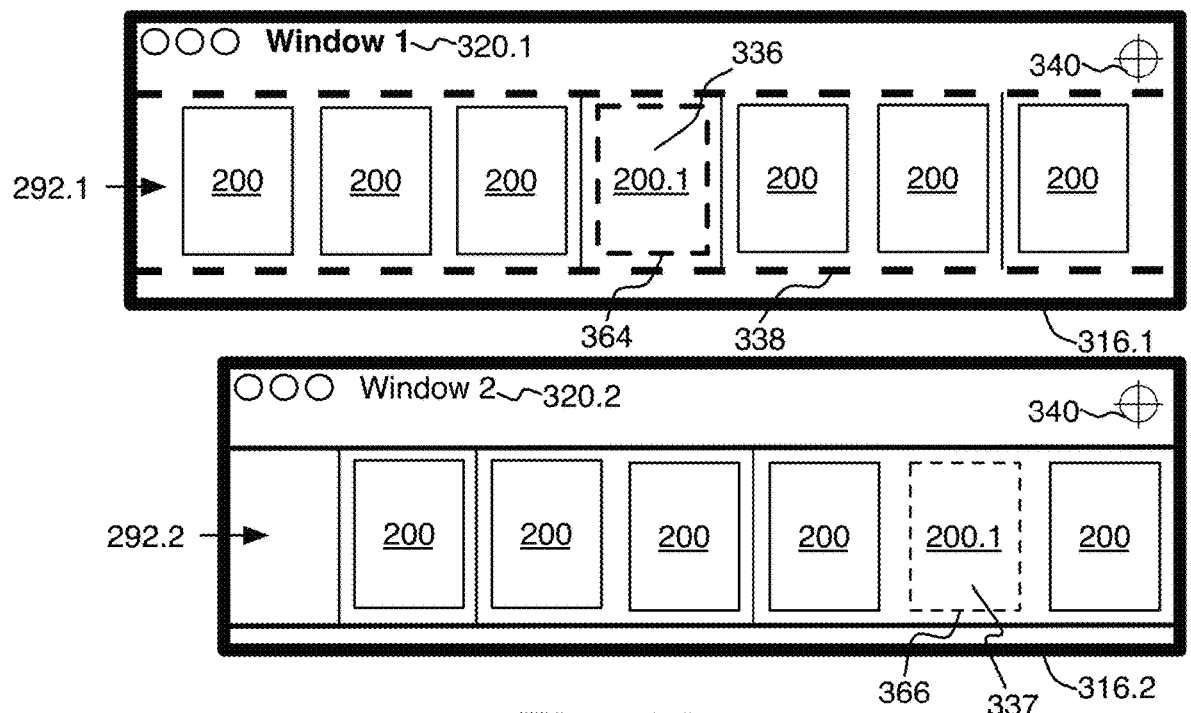
FIG. 32 is a schematic illustration of multiple windows comprising axes of documents disposed in a longitudinal and parallel arrangement with an active document and another instance of the active document in accordance with an exemplary embodiment of the present invention.

FIG. 32 shows two windows 316.1 and 316.2 containing axes 292.1 and 292.2. The windows may be components of a graphical user interface 234 (not shown in Figure) provided by an operating 135 (not shown in Figure), but is not limited to, since an application may also show sub windows within the display area 314 (not shown in Figure, but the edges of the figure may be considered as the limits of the viewport of the display area 314). Each window 316 have a window header 320.1 and 320.2. The first window header 320.1 may have emphasis so the user knows that its attached windows 316.1 is the active window. In the embodied example, each window has exactly one axis 292, but they may contain more axes 292 and even groups of axes 310. Each window may have a distinct aligning tool 340 giving the user possibility to use the centering and alignment function on each window. The user may have access to an inter-window alignment function. This function may be used when a third click is performed on the aligning tool 340. When the inter-window alignment function is triggered, other instance of the active document 337 on axes from other windows 316.

Figure 33:
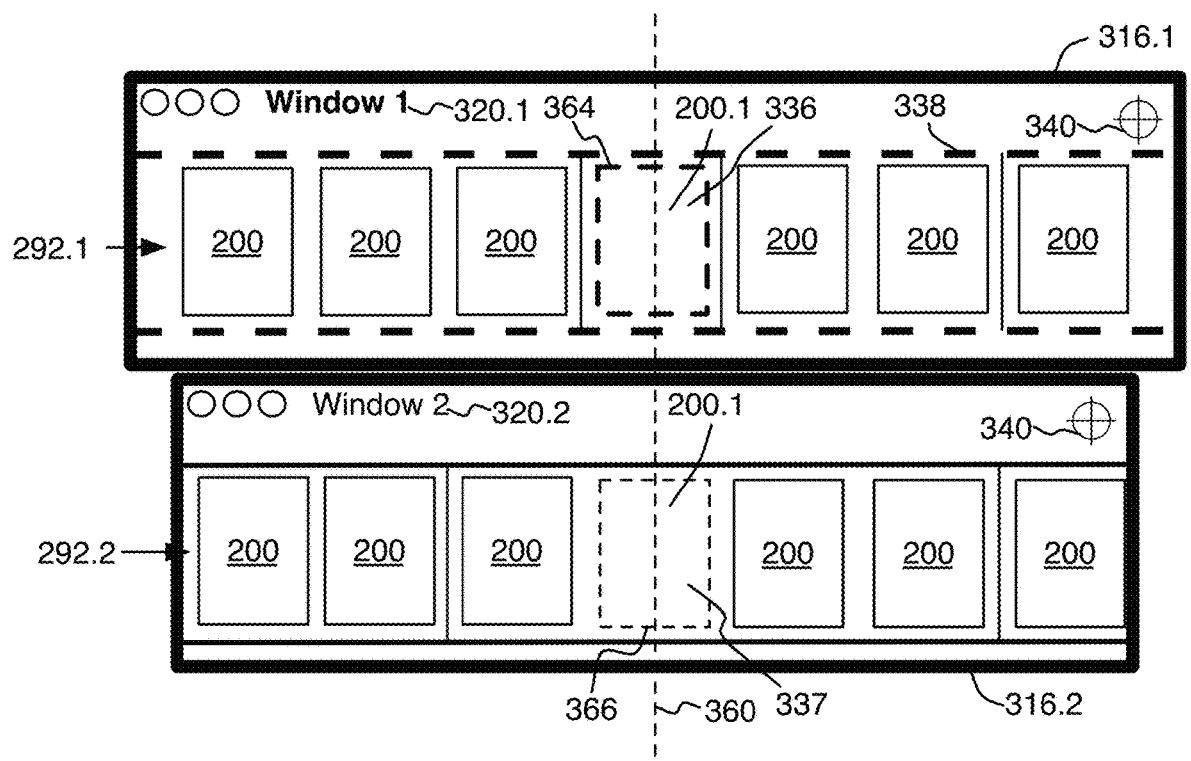
FIG. 33 is a schematic illustration of multiple windows aligned and comprising axes of documents disposed in a longitudinal and parallel arrangement with an active document and another aligned instance of the active document in accordance with an exemplary embodiment of the present invention.

FIG. 33 shows the result of the inter-window alignment function, where the two instances of the active document 200.1 are horizontally aligned. One can appreciate that the second window 316.2 has even moved to be centered relatively to the first window 316.1 and the two windows 316.1 and 316.2 are vertically stick one to the other. This may be another effect of the inter-window alignment function. A perpendicular alignment line 360 may be shown to let the user know different instances of the active document 200.1 are aligned, this can be shown inside the windows 316 or over the window if the windowing system of the graphical user interface 234 (not shown in Figure) provided by an operating 135 (not shown in Figure) is permitting it.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:
1. A method of locating a plurality of axes of documents to gather on a display area
   a subject document with a document related to the subject document, the method comprising:
   displaying a plurality of axes of documents, at least one of the axes being capable of relative axial displacement thereof, one of the axes of documents including the subject document and the other axes of documents being adapted to include the related document;
   enabling an alignment function for gathering the subject document and the related document on the display area;
   in response to enabling the alignment function, performing the steps comprising of
   searching if a related document is present on at least one of the other axes of documents; and
   if the related document is present on at least one of the other axes of documents, and if an axis of documents not including the related document is displayed adjacent to the axis of documents including the subject document,
   displaying an axis of documents including the related document adjacent to the axis of documents including the subject document instead of the axis of documents not including the related document;
   identifying an axial location of the subject document along the axis of documents including the subject document;
   identifying an axial location of the related document along the axis of documents including the related document;
   if the axial location of the subject document along the axis of documents including the subject document is not displayed near the axial location of the related document along the axis of documents including the related document, axially locating at least one of the axis of documents including the related document and the axis of documents including the subject document to display the subject document and the related document in substantial graphical proximity on the display area, whereby a user can visually associate the subject document with the related document on the display area.

2. The method of locating axes of documents of claim 1, wherein the axis of documents including the related document is substantially parallel with the axis of documents including the related document.

3. The method of locating axes of documents of claim 1, wherein the subject document and the related document are associated on a basis of Boolean logic.

4. The method of locating axes of documents of claim 1, wherein at least one of the axes of documents includes a collation function for ordering documents thereon, the collation function being a time-based order including a non-linear timescale and a time distribution that is variable, with equal lengths of time being visually represented with unequal lengths of distance along the axis of documents.

5. The method of locating axes of information elements of claim 1, wherein the related document is linked with the subject document.

6. The method of locating axes of information elements of claim 1, wherein the axis of documents including the subject document is disposed at a non-zero angle with respect to the axis of documents including the related document.

7. A method of displaying search results with a plurality of axes of search results to gather on a display area a subject search result with a search result related to the subject search result, the method comprising:
performing a search among a plurality of information elements;
displaying search results from the search in a plurality of axes of search results, at least one of the axes being capable of relative axial displacement thereof, an axis of search results including the subject search result, the other axes of search results being adapted to include a search result related to the subject search result;
enabling an alignment function for gathering the subject search result and a related search result on the display area;
in response to enabling the alignment function, performing the steps comprising of
searching if a related search result is present on at least one of the axes of search results adapted to include a related search result; and
if a related search result is present on at least one of the axes of search results, and if an axis of search results not including the related search result is displayed adjacent to the axis of search results including the subject search result,
displaying an axis of search results including the related search result adjacent to the axis of search results including the subject search result instead of the axis of search results not including the related search result;
identifying an axial location of the subject search result along the axis of search results including the subject search result;
identifying an axial location of the related search result along the axis of search results including the related search result;
if the axial location of the subject search result along the axis of search results including the subject search result is not displayed near the axial location of the related search result along the axis of search results including the related search result, axially locating at least one of the axis of search results including the related search result and the axis of search results including the subject search result to display the subject search result and the related search result in substantial graphical proximity on the display area, whereby a user can visually associate the subject search result with the related search result on the display area.

8. The method of displaying search results of claim 7, wherein the axis of search results including the related search result and the axis of search results including the subject search result are substantially parallel.

9. The method of displaying search results of claim 7, wherein the subject search result is linked with the related search result.

10. The method of displaying search results of claim 7, wherein at least one axis of search results includes a collation function for locating the search results thereon.

11. The method of displaying search results of claim 7, wherein the subject search result and the related search result are associated on a basis of Boolean logic.

12. The method of displaying search results of claim 7, wherein at least one of the axes is adapted to be locked to prevent axial displacement thereof.

13. The method of displaying search results of claim 7, wherein enabling the alignment function is made on a basis of an input provided by a user.

14. A non-transitory computer medium having stored thereon computer-readable instructions that, when executed by a processor of a computer system, cause the computer system to perform operations for locating a plurality of axes of documents to gather on a display area a subject document with a document related to the subject document, the operations comprising:
displaying a plurality of axes of documents, at least one of the axes being capable of relative axial displacement thereof, one of the axes of documents including the subject document and the other axes of documents being adapted to include a related document;
enabling an alignment function for gathering the subject document and the related document on the display area;
in response to enabling the alignment function, performing the steps comprising of
searching if a related document is present on at least one of the other axes of documents; and
if a related document is present on at least one of the other axes of documents, and if an axis of documents not including the related document is displayed adjacent to the axis of documents including the subject document,
displaying an axis of documents including the related document adjacent to the axis of documents including the subject document instead of the axis of documents not including the related document;
identifying an axial location of the subject document along the axis of documents including the subject document;
identifying an axial location of the related document along the axis of documents including the related document;
if the axial location of the subject document along the axis of documents including the subject document is not displayed near the axial location of the related document along the axis of documents including the related document, axially locating at least one of the axis of documents including the related document and the axis of documents including the subject document to display the subject document and the related document in substantial graphical proximity on the display area, whereby a user can visually associate the subject document with the related document on the display area.

15. The non-transitory computer medium of claim 14, wherein the axis of documents including the related document is substantially parallel with the axis of documents including the related document.

16. The non-transitory computer medium of 14, wherein the related document is linked with the subject document.

17. The non-transitory computer medium of claim 14, wherein at least one of the axes of documents includes a collation function for ordering documents thereon, the collation function being a time-based order including a non-linear timescale and a time distribution that is variable, with equal lengths of time being visually represented with unequal lengths of distance along the axis of documents.

18. The non-transitory computer medium of claim 14, wherein at least some of the search results are user-selectable.

19. The non-transitory computer medium of claim 14, wherein at least one of the axes is adapted to be locked to prevent axial displacement thereof.

20. The non-transitory computer medium of claim 14, wherein the axis of documents including the subject document is disposed at a non-zero angle with respect to the axis of documents including the related document.

* * * * *